United States Patent
Wang et al.

(10) Patent No.: US 12,507,045 B2
(45) Date of Patent: Dec. 23, 2025

(54) APPLICATION PROCESSING METHOD AND RELATED DEVICE

(71) Applicant: SHENZHEN YINWANG INTELLIGENT TECHNOLOGIES CO., LTD., Shenzhen (CN)

(72) Inventors: Jun Wang, Nanjing (CN); Xinyao Jin, Nanjing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 18/183,601

(22) Filed: Mar. 14, 2023

(65) Prior Publication Data
US 2023/0217220 A1   Jul. 6, 2023

Related U.S. Application Data

(63) Continuation of application No. PCT/CN2020/115541, filed on Sep. 16, 2020.

(51) Int. Cl.
*H04W 4/00* (2018.01)
*H04W 4/02* (2018.01)
*H04W 4/40* (2018.01)

(52) U.S. Cl.
CPC ............. *H04W 4/40* (2018.02); *H04W 4/023* (2013.01)

(58) Field of Classification Search
CPC ................................ H04W 4/40; H04W 4/023
See application file for complete search history.

(56) References Cited

U.S. PATENT DOCUMENTS

| | | | |
|---|---|---|---|
| 2007/0198682 A1 | 8/2007 | Pazhyannur et al. | |
| 2011/0219105 A1* | 9/2011 | Kryze | H04L 67/148 709/223 |

(Continued)

FOREIGN PATENT DOCUMENTS

| | | |
|---|---|---|
| CN | 102132593 A | 7/2011 |
| CN | 102571725 A | 7/2012 |

(Continued)

OTHER PUBLICATIONS

Office Action in Japanese Appln. No. 2023-517373, mailed on Feb. 26, 2024, 14 pages (with English translation).

(Continued)

*Primary Examiner* — Erika A Washington
(74) *Attorney, Agent, or Firm* — Fish & Richardson P.C.

(57) ABSTRACT

Application processing methods and apparatuses applied to an intelligent vehicle are provided. One application processing method comprises: monitoring a distance between a terminal device and an intelligent vehicle, running a second application on the intelligent vehicle in response to a first preset condition being met, wherein the first preset condition comprises that the distance is less than a first threshold, obtaining a first use status of a first application running on the terminal device in response to a second preset condition being met, wherein the second preset condition comprises that the distance is less than a second threshold, and the second application is a version of the first application for the intelligent vehicle, and synchronizing the first use status to the second application on the intelligent vehicle.

20 Claims, 21 Drawing Sheets

(56) References Cited

U.S. PATENT DOCUMENTS

| | | | |
|---|---|---|---|
| 2012/0046808 A1* | 2/2012 | Furuta | H04M 1/72406 |
| | | | 701/2 |
| 2013/0096771 A1* | 4/2013 | Srenger | B60R 16/0373 |
| | | | 701/36 |
| 2015/0223032 A1 | 8/2015 | Nespolo et al. | |
| 2015/0228000 A1* | 8/2015 | Bijor | H04W 4/021 |
| | | | 705/13 |
| 2017/0048680 A1* | 2/2017 | Chuang | H04W 4/80 |
| 2018/0099643 A1 | 4/2018 | Golsch et al. | |

FOREIGN PATENT DOCUMENTS

| | | | |
|---|---|---|---|
| CN | 109358905 A | 2/2019 | |
| JP | 2005128729 A | 5/2005 | |
| JP | 2009503920 A | 1/2009 | |
| JP | 2009296223 A | 12/2009 | |
| JP | 2010063053 A | 3/2010 | |
| JP | 2010093515 A | 4/2010 | |
| JP | 2010281727 A | 12/2010 | |
| JP | 2011024120 A | 2/2011 | |
| JP | 2011187058 A | 9/2011 | |
| JP | 2012121385 A | 6/2012 | |
| JP | 2013126092 A | 6/2013 | |
| JP | 2015062266 A | 4/2015 | |
| JP | 2015085899 A | 5/2015 | |
| JP | 2019185668 A | 10/2019 | |
| KR | 20190080253 A | 7/2019 | |

OTHER PUBLICATIONS

Extended European Search Report in European Appln No. 20953569.9, dated Sep. 29, 2023, 11 pages.

Office Action in Japanese Appln. No. 2023-517373, mailed on Jul. 29, 2024, 14 pages (with English translation).

Office Action in Korean Appln. No. 2023-7012092, mailed on Aug. 1, 2025, 6 pages (with English translation).

* cited by examiner

APPLICATION PROCESSING METHOD AND RELATED DEVICE

CROSS-REFERENCE TO RELATED APPLICATIONS

This application is a continuation of International Application No. PCT/CN2020/115541, filed on Sep. 16, 2020, the disclosure of which is hereby incorporated by reference in its entirety.

TECHNICAL FIELD

Embodiments of this application relate to the field of application processing technologies, and in particular, to an application processing method and a related device.

BACKGROUND

With the rapid development of intelligent vehicles, users have higher requirements for use of in-vehicle applications (APP) on the intelligent vehicles. Currently, there are usually the following two methods for using a related application on an in-vehicle central control screen: 1. using an original in-vehicle application provided by a vehicle vendor; 2. connecting a smartphone to an in-vehicle central control screen through a universal serial bus (USB) or a wireless fidelity (WiFi) technology, and then enabling a projection function on a mobile phone through an in-vehicle mobile application desktop such as CarPlay or CarLife, to project an in-vehicle service screen of the mobile phone onto the in-vehicle central control screen for display, so that a user can use a related application on the in-vehicle central control screen. As described above, in the intelligent vehicle, the user can use an in-vehicle ecosystem application service aggregated by a service vendor or an in-vehicle ecosystem application service aggregated by a service provider such as CarPlay or CarLife.

However, in a process in which the user uses the mobile application, if the user wants to enter the vehicle and continue with the use on the in-vehicle application based on a current use status of the mobile application, the user usually needs to manually start the in-vehicle application, log in with an account, and perform a plurality of operations. For example, when the user wants the in-vehicle application to continue to play a song that is currently being played by the mobile application, the user usually needs to manually start the in-vehicle application, log in with a same user account, select a same song, and drags a play progress bar to a corresponding position. Operations are complex, and user experience is poor.

SUMMARY

Embodiments of this application provide an application processing method and a related device, to reduce operations performed by a user in an intelligent vehicle and improve user experience.

According to a first aspect, an embodiment of this application provides an application processing method, applied to an intelligent vehicle. The method includes: monitoring a target distance between a terminal device and the intelligent vehicle, where a first application runs on the terminal device; if a first preset condition is met, running a second application on the intelligent vehicle, where the first preset condition includes that the target distance is less than a first threshold, and the second application is a version of the first application for the intelligent vehicle; and if a second preset condition is met, obtaining a use status of the first application on the terminal device, and synchronizing the use status to the second application, where the second preset condition includes that the target distance is less than a second threshold, and the second threshold is less than the first threshold.

According to the method provided in the first aspect, when a user wants to enter a cockpit of the intelligent vehicle and use a corresponding in-vehicle application on the vehicle, the intelligent vehicle may monitor a distance between the terminal device (for example, a mobile phone) held by the user and the intelligent vehicle, and determine, based on the distance, the user's intention of entering the vehicle. When the distance between the terminal device and the intelligent vehicle is less than a specified value (for example, 2.8 m, 3 m, or 4 m), it may be considered that the user has an intention of entering the vehicle. In this case, the intelligent vehicle may run the corresponding in-vehicle application on the vehicle based on a terminal application that is being used by the user on the terminal device. The in-vehicle application may be a version of the terminal application on the intelligent vehicle (for example, an in-vehicle music application or an in-vehicle radio application applicable to the intelligent vehicle). Further, when the intelligent vehicle detects that the distance between the terminal device and the intelligent vehicle is shortened again (for example, 1 m), the intelligent vehicle may synchronize a current use status of the terminal application to the in-vehicle application, so that when entering the vehicle, the user can continue with the use of the mobile phone by using the in-vehicle application in the synchronized use status, thereby greatly improving use experience of the user. For example, when the user enters the vehicle, the user may continue to play a song on a music application of a terminal version based on the same song play progress, playlist, play mode, sound effect, volume, and the like by using the in-vehicle music application in the synchronized use status. Therefore, in a conventional technology, when a user wants to continue, on an in-vehicle application, with the use of a terminal application, the user usually needs to enter a vehicle, manually starts the in-vehicle application, and then performs a series of operations based on a use status on the mobile phone, so that the in-vehicle application reaches a same use status as the terminal application, which leads to complex operations and poor experience. Compared with the conventional technology, the intelligent vehicle in this application may run the in-vehicle application in advance when determining that the user has an intention of entering the vehicle, and may synchronize the use status of the terminal application to the in-vehicle application when the user is about to enter the vehicle or after the user enters the vehicle, so that the user may directly continue with the use on the in-vehicle application based on the original use status on the terminal device, thereby greatly improving use experience of the user.

In a possible implementation, before the monitoring a target distance between a terminal device and the intelligent vehicle, the method further includes: establishing a bluetooth connection to the terminal device, where the terminal device is a device that pre-matches the intelligent vehicle.

In this embodiment of this application, the intelligent vehicle and the terminal device may be matched in advance through a bluetooth connection, for example, uniquely determined matching is performed between the terminal device and the intelligent vehicle by entering a license plate number and an identity card number. In this way, when detecting, within a bluetooth communication range, a terminal device that matches the intelligent vehicle, the intelligent vehicle may establish a bluetooth connection to the terminal device, so as to provide a reliable bluetooth communication channel for performing a subsequent step. In this way, unique matching between the terminal device of the user and the intelligent vehicle can be ensured, and property security of the user can be maintained, to prevent interaction between another terminal device and the intelligent vehicle of the user, and prevent harming user interests. In some possible embodiments, the pre-matching may not require strict authentication on the license plate number, the identity card number, and the like, and a terminal device that merely has ever established a bluetooth connection to the intelligent vehicle may also be considered as a device that pre-matches the intelligent vehicle. This is not specifically limited in this embodiment of this application.

In a possible implementation, the intelligent vehicle includes N antennas, N is an integer greater than or equal to 1, and the monitoring a target distance between a terminal device and the intelligent vehicle includes: sending a request message to the terminal device through at least one of the N antennas based on the bluetooth connection to the terminal device, and receiving a response message returned by the terminal device; and monitoring the target distance between the terminal device and the intelligent vehicle based on signal strength of the response message.

In this embodiment of this application, the intelligent vehicle may perform message transmission with the terminal device through a plurality of antennas installed on the vehicle, calculate the distance between the terminal device and the intelligent vehicle based on signal strength of a received message sent by the terminal device, and determine the user's intention of entering the vehicle. This greatly improves accuracy of distance calculation, and thus enhances accuracy of determining the user's intention of entering the vehicle, so that the intelligent vehicle can run the in-vehicle application and synchronize the use status at a proper time, thereby effectively ensuring use experience of the user.

In a possible implementation, the method further includes: receiving name information of the first application sent by the terminal device.

In this embodiment of this application, the intelligent vehicle may receive, based on the bluetooth connection to the terminal device, corresponding information that is sent by the terminal device and that is about a terminal application being used by the user on the terminal device, which includes, for example, the name information of the terminal application. Therefore, when subsequently determining that the user has an intention of entering the vehicle, the intelligent vehicle may efficiently and accurately run the corresponding in-vehicle application based on the name, to avoid incorrect running of another in-vehicle application, ensure accurate synchronization of a subsequent use status, and ensure use experience of the user.

In a possible implementation, the running a second application on the intelligent vehicle includes: determining the second application on the intelligent vehicle based on the name information, and running the second application.

In this embodiment of this application, when determining that the user has an intention of entering the vehicle, the intelligent vehicle may efficiently and accurately run the corresponding in-vehicle application on the vehicle based on the name that is sent by the terminal device and that is of the terminal application being used by the user on the terminal device, to avoid incorrect running of another in-vehicle application, ensure accurate synchronization of a subsequent use status, and ensure use experience of the user. Further, after the in-vehicle application runs, the intelligent vehicle may further log in to the in-vehicle application based on account information stored when the user previously uses the in-vehicle application. In some possible embodiments, the terminal device may also send the account information of the terminal application to the intelligent vehicle, so that the intelligent vehicle may log in to the in-vehicle application directly based on the received account information, and the like, thereby ensuring synchronization of a use status of a same user account between the terminal application and the in-vehicle application.

In a possible implementation, the use status of the first application is a status of the first application running on the terminal device synchronized to a server, and the obtaining a use status of the first application on the terminal device includes: sending an obtaining request to the server, where the obtaining request carries the name information, and obtaining the use status of the first application on the terminal device from the server based on the name information.

In this embodiment of this application, in a process of running the terminal application, the terminal device may synchronize the use status of the terminal application to the server, for example, a service background of the terminal application. Optionally, the terminal device may synchronize the current use status of the terminal device to the server at an interval (for example, 3 s, 5 s, or 7 s), and the server may store the current use status. When determining that the user is about to enter the vehicle, the intelligent vehicle may efficiently and accurately obtain the corresponding use status from the server based on the received name information, account information, and the like corresponding to the terminal application. For example, the use status is a current use status of a music application X of user Zhang San, and may include, for example, a current song name, song play progress, a playlist, a play mode, a sound effect, and volume.

In a possible implementation, the first preset condition further includes one or more of the following: a change trend of the target distance is a gradually shortening trend, and a change trend of the target distance is gradually approaching a door of a driving seat of the intelligent vehicle.

In this embodiment of this application, the intelligent vehicle may further accurately determine the user's intention of entering the vehicle based on the change trend of the distance between the terminal device and the intelligent vehicle (for example, the distance is gradually shortened, where there is no back and forth change, for example, 4 m, 6 m, 7 m, 9 m, and the like; for another example, the distance is gradually shortened to close to the door of the driving seat than a trunk, that is, a distance between the user and the door of the driving seat is always less than or gradually less than a distance between the user and the trunk, and so on), so as to determine whether to run a corresponding in-vehicle application. In this way, interferences such as wandering around the vehicle by the user and approaching the trunk of the vehicle to pick up articles can be eliminated, which avoids unnecessary running of the in-vehicle application, and reduces electrical energy consumption of the intelligent vehicle.

In a possible implementation, the second preset condition further includes one or more of the following: the intelligent vehicle is in an unlocked state, the intelligent vehicle is in a started state, the terminal device is located in the intelligent vehicle, and pressure measured by a pressure sensor is greater than or equal to a preset pressure value. The pressure sensor is a pressure sensor corresponding to the driving seat or a passenger seat of the intelligent vehicle.

In this embodiment of this application, the intelligent vehicle may further determine whether the user is about to enter or has entered the vehicle or the like based on aspects such as whether the intelligent vehicle is in an unlocked state or in a started state, whether the terminal device is located in the intelligent vehicle, and whether the pressure measured by the pressure sensor under the driving seat or the passenger seat is greater than or equal to the preset pressure value (that is, whether the user enters the vehicle and sits down), so as to determine whether to synchronize the use status of the terminal application to the in-vehicle application, thereby avoiding unnecessary data transmission and calculation, and reducing electrical energy consumption of the intelligent vehicle.

In a possible implementation, after the obtaining a use status of the first application on the terminal device, and synchronizing the use status to the second application, the method further includes: sending a target message to the terminal device, where the target message is used to indicate the terminal device to exit the first application.

In this embodiment of this application, after synchronizing the current use status of the terminal application to the in-vehicle application, the intelligent vehicle may further send a message to the terminal device, to indicate the terminal device to exit the terminal application. In other words, the in-vehicle application completely takes over a service of the terminal application, thereby reducing unnecessary application running on the terminal device and power consumption of terminal devices.

In a possible implementation, after the obtaining a current use status of the first application on the terminal device, and synchronizing the use status to the second application, if a third preset condition is met, the method further includes: exiting the second application, where the third preset condition includes one or more of the following: the target distance is greater than a third threshold, the intelligent vehicle is in a locked state, the intelligent vehicle is in a shut-off state, the terminal device is located outside the intelligent vehicle, and pressure measured by the pressure sensor is less than a preset pressure value; and the pressure sensor is a pressure sensor corresponding to the driving seat or the passenger seat of the intelligent vehicle; and indicating the terminal device to synchronize a use status of the second application to the first application, where the use status of the second application is a status that is of the second application running on the vehicle equipment and that is synchronized to the server.

In this embodiment of this application, the intelligent vehicle may automatically exit the in-vehicle application when it is detected that the terminal device is far away from the intelligent vehicle, the intelligent vehicle has been shut off, or the intelligent vehicle has been locked, or the like, to avoid continuous running of the in-vehicle application when the user leaves a seat cabin and does not manually close the in-vehicle application, and to reduce electrical energy consumption of the intelligent vehicle. Further, when detecting that the user has an intention of leaving the vehicle or the user has left the vehicle, the intelligent vehicle may further send indication information to the terminal device, to indicate the terminal device to synchronize the use status of the in-vehicle application to the terminal application, to achieve automatic switching between the terminal application and the in-vehicle application in different cases, so that the user can still continue with the use on the terminal device after leaving the vehicle, thereby further improving user experience.

According to a second aspect, an embodiment of this application provides an application processing method, applied to a terminal device, where the terminal device runs a first application. The method includes: sending name information of the first application to an intelligent vehicle, where the name information is used to, when the intelligent vehicle meets a first preset condition, determine a second application on the intelligent vehicle based on the name information, and run the second application; and is used to, when the intelligent vehicle meets a second preset condition, obtain a current use status of the first application on the terminal device based on the name information, and synchronize the use status to the second application. The second application is a version of the first application for the intelligent vehicle. The first preset condition includes that a target distance between the terminal device and the intelligent vehicle is less than a first threshold. The second preset condition includes that the target distance is less than a second threshold, where the second threshold is less than the first threshold.

According to the method provided in the second aspect, the terminal device (for example, a mobile phone) may send name information of a terminal application running on the terminal device to the intelligent vehicle matching the terminal device. In this way, when the intelligent vehicle detects that a distance between the terminal device and the intelligent vehicle is less than a specified value (for example, 4 m, 3 m, or 2.8 m, which may also be considered as that the user has an intention of entering the vehicle), the intelligent vehicle may determine and run a corresponding in-vehicle application on the vehicle based on the received name information, and may further log in to the in-vehicle application based on account information historically stored in the in-vehicle application or based on account information sent by the terminal device. The in-vehicle application may be a version of the terminal application on the intelligent vehicle (for example, an in-vehicle music application or an in-vehicle radio application applicable to the intelligent vehicle). Further, when the intelligent vehicle detects that the distance between the terminal device and the intelligent vehicle is shortened again (for example, 1 m), the intelligent vehicle may obtain the current use status of the terminal application based on the name information and the account information, and synchronize the use status to the in-vehicle application, so that when entering the vehicle, the user can continue with the use on the terminal device by using the in-vehicle application in the synchronized use status, thereby greatly improving use experience of the user. Therefore, in a conventional technology, when a user wants to continue with the use of a terminal application on an in-vehicle application, the user usually needs to enter a vehicle, manually starts the in-vehicle application, and then performs a series of operations based on a use status on the terminal device, so that the in-vehicle application reaches a same use status as the terminal application, which leads to complex operations and poor experience. Compared with the conventional technology, the intelligent vehicle in this application may run the in-vehicle application in advance when determining that the user has an intention of entering the vehicle, and may synchronize the use status of the terminal application to the in-vehicle application when the user is about to enter the vehicle or after the user enters the vehicle, so that the user may directly continue with the use on the in-vehicle application based on the original use status on the terminal device, thereby greatly improving use experience of the user.

In a possible implementation, the method further includes: synchronizing the use status of the first application to a server, where the server is used by the intelligent vehicle to obtain the use status of the first application on the terminal device from the server based on the name information.

In this embodiment of this application, in a process of running the terminal application, the terminal device may synchronize the use status of the terminal application to the server, for example, a service background of the terminal application. Optionally, the terminal device may synchronize the current use status of the terminal device to the server at an interval (for example, 3 s, 5 s, or 7 s), and the server may store the current use status. When determining that the user is about to enter the vehicle, the intelligent vehicle may efficiently and accurately obtain the corresponding use status from the server based on the received name information corresponding to the terminal application, corresponding account information, and the like. For example, the use status is a current use status of a music application X of user Zhang San, and may include, for example, a current song name, song play progress, a playlist, a play mode, a sound effect, and volume.

In a possible implementation, before the sending name information of the first application to an intelligent vehicle, the method further includes: establishing a bluetooth connection to the intelligent vehicle, where the terminal device is a device that pre-matches the intelligent vehicle.

In this embodiment of this application, the terminal device and the intelligent vehicle may be matched in advance through a bluetooth connection, for example, uniquely determined matching is performed between the terminal device and the intelligent vehicle by entering a license plate number and an identity card number. In this way, when detecting, within a bluetooth communication range, a terminal device that matches the intelligent vehicle, the intelligent vehicle may establish a bluetooth connection to the terminal device, so as to provide a reliable bluetooth communication channel for performing a subsequent step. In this way, unique matching between the terminal device of the user and the intelligent vehicle can be ensured, and property security of the user can be maintained, to prevent interaction between another terminal device and the intelligent vehicle of the user, and prevent harming user interests.

According to a third aspect, an embodiment of this application provides an application processing method, applied to a server, and including: receiving a use status that is of a first application running on a terminal device and that is synchronized to the first application of the server; sending the use status of the first application on the terminal device to the intelligent vehicle based on an obtaining request of the intelligent vehicle. The use status is used by the intelligent vehicle to synchronize the use status to a second application based on the use status. The second preset condition includes that a target distance between the terminal device and the intelligent vehicle is less than a second threshold. The second application is a version of the first application for the intelligent vehicle.

According to the method provided in the second aspect, the server may receive and store the use status that is of the terminal application and that is synchronized to the server (for example, a service background of the terminal application) by the terminal device in a process of running the terminal application. Then, when the intelligent vehicle detects that the distance between the terminal device and the intelligent vehicle is less than a specific threshold (that is, when a user is about to enter the vehicle or has entered the vehicle), the server may send the current use status of the terminal application on the terminal device to the intelligent vehicle based on the obtaining request of the intelligent vehicle. In this way, the intelligent vehicle may synchronize the use status to the in-vehicle application on the vehicle. Therefore, when determining that the user has an intention of entering the vehicle, for example, when the user is about to enter the vehicle or after the user enters the vehicle, the intelligent vehicle may synchronize the use status of the terminal application to the in-vehicle application, so that the user may directly continue with the use on the in-vehicle application based on the original use status of the terminal device, thereby reducing a large quantity of user operations and greatly improving use experience of the user.

According to a fourth aspect, an embodiment of this application provides an application processing apparatus, where the apparatus includes a vehicle equipment and a bluetooth module.

The bluetooth module is configured to monitor a target distance between a terminal device and the intelligent vehicle, where a first application runs on the terminal device.

If a first preset condition is met, the bluetooth module is further configured to: start a vehicle equipment, and indicate the vehicle equipment to run a second application on the intelligent vehicle, where the first preset condition includes that the target distance is less than a first threshold, and the second application is a version of the first application for the intelligent vehicle.

If a second preset condition is met, the bluetooth module is further configured to indicate the vehicle equipment to obtain a use status of the first application on the terminal device, and synchronize the use status to the second application, where the second preset condition includes that the target distance is less than a second threshold, and the second threshold is less than the first threshold.

It should be noted that the application processing apparatus described in the fourth aspect may be an in-vehicle system on the intelligent vehicle, and may include the vehicle equipment, the bluetooth module, and the like; or may be a body of the intelligent vehicle, and may include the vehicle equipment, the bluetooth module, and the like.

In a possible implementation, the bluetooth module is further configured to:

establish a bluetooth connection to the terminal device, where the terminal device is a device that pre-matches the intelligent vehicle.

In a possible implementation, the apparatus further includes N antennas, the bluetooth module is connected to the N antennas, and N is an integer greater than or equal to 1. The bluetooth module is specifically configured to:

send a request message to the terminal device through at least one of the N antennas based on the bluetooth connection to the terminal device, and receive a response message returned by the terminal device; and monitor the target distance between the terminal device and the intelligent vehicle based on signal strength of the response message.

In a possible implementation, the bluetooth module is further configured to:

receive name information of the first application sent by the terminal device.

In a possible implementation, the vehicle equipment is specifically configured to:

determine the second application on the intelligent vehicle based on the name information, and run the second application.

In a possible implementation, the use status of the first application is a status that is of the first application running on the terminal device and that is synchronized to a server. The vehicle equipment is specifically configured to:

send an obtaining request to the server, where the obtaining request carries the name information; and obtain the use status of the first application on the terminal device from the server based on the name information.

In a possible implementation, the first preset condition further includes one or more of the following: a change trend of the target distance is a gradually shortening trend, and a change trend of the target distance is gradually approaching a door of a driving seat of the intelligent vehicle.

In a possible implementation, the second preset condition further includes one or more of the following: the intelligent vehicle is in an unlocked state, the intelligent vehicle is in a started state, the terminal device is located in the intelligent vehicle, and pressure measured by a pressure sensor is greater than or equal to a preset pressure value; and the pressure sensor is a pressure sensor corresponding to the driving seat or a passenger seat of the intelligent vehicle.

In a possible implementation, the bluetooth module is further configured to:

send a target message to a terminal device, where the target message is used to indicate the terminal device to exit the first application.

In a possible implementation, if a third preset condition is met, the bluetooth module is further configured to indicate the vehicle equipment to exit the second application, where the third preset condition includes one or more of the following: the target distance is greater than a third threshold, the intelligent vehicle is in a locked state, the intelligent vehicle is in a shut-off state, the terminal device is located outside the intelligent vehicle, and pressure measured by the pressure sensor is less than a preset pressure value; and the pressure sensor is a pressure sensor corresponding to the driving seat or the passenger seat of the intelligent vehicle; and indicating the terminal device to synchronize the use status of the second application to the first application, where the use status of the second application is a stats that is of the second application running on the vehicle equipment and that is synchronized to the server.

According to a fifth aspect, an embodiment of this application provides an application processing apparatus. The application processing apparatus includes a processor and a memory, the processor is coupled to the memory, and the memory is configured to store computer program code. The computer program code includes computer instructions, and the processor invokes the computer instructions to enable the application processing apparatus to:

run a second application on an intelligent vehicle based on a first instruction, where the first instruction is an instruction sent when it is detected that the target distance between the intelligent vehicle and a terminal device meets a first preset condition, the first preset condition includes that the target distance is less than a first threshold, and a first application runs on the terminal device; and obtain a use status of the first application on the terminal device based on a second instruction, and synchronize the use status to the second application, where the second instruction is an instruction sent when it is detected that the target distance between the intelligent vehicle and the terminal device meets a second preset condition, the second preset condition includes that the target distance is less than a second threshold, the second threshold is less than the first threshold, and the second application is a version of the first application for the intelligent vehicle.

It should be noted that the application processing apparatus described in the fifth aspect may be a vehicle equipment, or may be a body of the intelligent vehicle. In addition, the vehicle equipment may be a related device in the vehicle that has functions such as running an in-vehicle application and synchronizing the use status, for example, may be an in-vehicle computer with a display screen or another possible device or the like. This is not specifically limited in this embodiment of this application.

In a possible implementation, before the second application on the intelligent vehicle is run based on the first instruction, the intelligent vehicle has established a bluetooth connection to the terminal device, and the terminal device is a device that pre-matches the intelligent vehicle.

In a possible implementation, the target distance between the terminal device and the intelligent vehicle is obtained through monitoring based on signal strength of a response message, where the response message is a message returned by the terminal device based on a request message. The request message is a message sent to the terminal device by at least one of N antennas, and N is an integer greater than or equal to 1.

In a possible implementation, the processor is specifically configured to invoke the computer instructions, to enable the application processing apparatus to:

determine the second application on the intelligent vehicle based on name information, and running the second application, where the name information is information sent by the terminal device.

In a possible implementation, the use status of the first application is a status that is of the first application running on the terminal device and that is synchronized to a server. The processor is specifically configured to invoke the computer instructions, to the application processing apparatus to:

send an obtaining request to the server, where the obtaining request carries the name information; and obtain the use status of the first application on the terminal device from the server based on the name information.

In a possible implementation, the first preset condition further includes one or more of the following: a change trend of the target distance is a gradually shortening trend, and a change trend of the target distance is gradually approaching a door of a driving seat of the intelligent vehicle.

In a possible implementation, the second preset condition further includes one or more of the following: an intelligent vehicle is in an unlocked state, the intelligent vehicle is in a started state, the terminal device is located in the intelligent vehicle, and pressure measured by a pressure sensor is greater than or equal to a preset pressure value. The pressure sensor is a pressure sensor corresponding to the driving seat or a passenger seat of the intelligent vehicle.

In a possible implementation, after the use status of the first application on the terminal device is obtained and the use status is synchronized to the second application, the first application on the terminal device is in an exited state.

In a possible implementation, if a third preset condition is met, the processor is further configured to invoke the computer instructions, to enable the application processing apparatus to:

exit the second application, where the third preset condition includes one or more of the following: the target distance is greater than a third threshold, the intelligent vehicle is in a locked state, the intelligent vehicle is in a shut-off state, the terminal device is located outside the intelligent vehicle, and pressure measured by the pressure sensor is less than a preset pressure value; and the pressure sensor is a pressure sensor corresponding to the driving seat or the passenger seat of the intelligent vehicle; and indicating, through a bluetooth module, the terminal device to synchronize the use status of the second application to the first application, where the use status of the second application is a status that is of the second application running on the application processing apparatus and that is synchronized to the server.

According to a sixth aspect, an embodiment of this application provides an application processing apparatus, including:

a monitoring unit, configured to monitor a target distance between a terminal device and the intelligent vehicle, where a first application runs on the terminal device;

a running unit, configured to: if a first preset condition is met, run a second application on the intelligent vehicle, where the first preset condition includes that the target distance is less than a first threshold, and the second application is a version of the first application for the intelligent vehicle; and a first synchronization unit, configured to: if a second preset condition is met, obtain a use status of the first application on the terminal device, and synchronize the use status to the second application, where the second preset condition includes that the target distance is less than a second threshold, and the second threshold is less than the first threshold.

In a possible implementation, the apparatus further includes:

a bluetooth connection unit, configured to establish a bluetooth connection to the terminal device, where the terminal device is a device that pre-matches the intelligent vehicle.

In a possible implementation, the intelligent vehicle includes N antennas, N is an integer greater than or equal to 1, and the monitoring unit is specifically configured to:

send a request message to the terminal device through at least one of the N antennas based on the bluetooth connection to the terminal device, and receive a response message returned by the terminal device; and monitor the target distance between the terminal device and the intelligent vehicle based on signal strength of the response message.

In a possible implementation, the apparatus further includes:

a receiving unit, configured to receive name information of the first application sent by the terminal device.

In a possible implementation, the running unit is specifically configured to:

determine the second application on the intelligent vehicle based on the name information, and run the second application.

In a possible implementation, the use status of the first application is a status that is of the first application running on the terminal device and that is synchronized to a server, and the synchronization unit is specifically configured to:

send an obtaining request to the server, where the obtaining request carries the name information; and obtain the use status of the first application on the terminal device from the server based on the name information.

In a possible implementation, the first preset condition further includes one or more of the following: a change trend of the target distance is a gradually shortening trend, and a change trend of the target distance is gradually approaching a door of a driving seat of the intelligent vehicle.

In a possible implementation, the second preset condition further includes one or more of the following: the intelligent vehicle is in an unlocked state, the intelligent vehicle is in a started state, the terminal device is located in the intelligent vehicle, and pressure measured by a pressure sensor is greater than or equal to a preset pressure value. The pressure sensor is a pressure sensor corresponding to the driving seat or a passenger seat of the intelligent vehicle.

In a possible implementation, the apparatus further includes:

a sending unit, configured to send a target message to the terminal device, where the target message is used to indicate the terminal device to exit the first application.

In a possible implementation, if a third preset condition is met, the apparatus further includes:

an exit unit, configured to exit the second application, where the third preset condition includes one or more of the following: the target distance is greater than a third threshold, the intelligent vehicle is in a locked state, the intelligent vehicle is in a shut-off state, the terminal device is located outside the intelligent vehicle, and pressure measured by the pressure sensor is less than a preset pressure value; and the pressure sensor is a pressure sensor corresponding to the driving seat or a passenger seat of the intelligent vehicle; and a second synchronization unit, configured to indicate the terminal device to synchronize the use status of the second application to the first application, where the use status of the second application is a status that is of the second application running on the vehicle equipment and that is synchronized to the server.

According to a seventh aspect, an embodiment of this application provides an application processing apparatus, applied to a terminal device, where a first application runs on the terminal device, and the apparatus includes:

a sending unit, configured to send name information of the first application to an intelligent vehicle, where the name information is used by the intelligent vehicle to determine a second application on the intelligent vehicle based on the name information when a first preset condition is met, and to run the second application; and is used by the intelligent vehicle to obtain a use status of the first application on the terminal device based on the name information when a second preset condition is met, and synchronize the use status to the second application. The second application is a version of the first application for the intelligent vehicle. The first preset condition includes that a target distance between the terminal device and the intelligent vehicle is less than a first threshold. The second preset condition includes that the target distance is less than a second threshold. The second threshold is less than the first threshold.

In a possible implementation, the apparatus further includes:

a synchronization unit, configured to synchronize the use status of the first application to a server, where the server is used by the intelligent vehicle to obtain the use status of the first application on the terminal device from the server based on the name information.

In a possible implementation, the apparatus further includes:

a bluetooth connection unit, configured to establish a bluetooth connection to the intelligent vehicle, where the terminal device is a device that pre-matches the intelligent vehicle.

According to an eighth aspect, an embodiment of this application provides an application processing apparatus, applied to a server, and including:

a receiving unit, configured to receive a use status that is of a first application running on a terminal device and that is synchronized to the first application of the server; and a sending unit, configured to send the use status of the first application on the terminal device to the intelligent vehicle based on an obtaining request of the intelligent vehicle, where the use status is used by the intelligent vehicle to synchronize the use status of to the second application based on the use status, the second preset condition includes that a target distance between the terminal device and the intelligent vehicle is less than a second threshold, and the second application is a version of the first application for the intelligent vehicle.

According to a ninth aspect, an embodiment of this application provides an intelligent vehicle. The intelligent vehicle includes one or more processors, and the one or more processors are configured to support the computing device to implement corresponding functions in the application processing method provided in the first aspect. The computing device may further include a memory. The memory is configured to be coupled to the processor, and store program instructions and data used to the computing device. The computing device may further include a communications interface, configured to implement communication between the computing device and another device or a communications network. The one or more processors may include processors of different components in the intelligent vehicle, may include one or more processors of a vehicle equipment in the intelligent vehicle, or may include one or more processors of a bluetooth module in the intelligent vehicle, or the like.

According to a tenth aspect, an embodiment of this application provides a terminal device. The terminal device includes a processor, and the processor is configured to support the computing device to implement corresponding functions in the application processing method provided in the second aspect. The computing device may further include a memory. The memory is coupled to the processor, and stores program instructions and data used to the terminal device. The terminal device may further include a communications interface, configured to implement communication between the terminal device and another device or a communications network.

According to an eleventh aspect, an embodiment of this application provides a server. The server includes a processor, and the processor is configured to support the computing device to implement corresponding functions in the application processing method provided in the third aspect. The computing device may further include a memory. The memory is coupled to the processor, and stores program instructions and data used to the terminal device. The terminal device may further include a communications interface, configured to implement communication between the terminal device and another device or a communications network.

According to a twelfth aspect, an embodiment of this application provides a computer readable storage medium. The computer readable storage medium stores a computer program, and when the computer program is executed by a processor, the application processing method procedure according to any implementation of the first aspect is implemented. The processor may be one or more processors.

According to a thirteenth aspect, an embodiment of this application provides a computer readable storage medium, where the computer readable storage medium stores a computer program, and when the computer program is executed by a processor, the application processing method procedure according to any implementation of the second aspect is implemented.

According to a fourteenth aspect, an embodiment of this application provides a computer readable storage medium. The computer readable storage medium stores a computer program, and when the computer program is executed by a processor, the application processing method procedure according to any implementation of the third aspect is implemented.

According to a fifteenth aspect, an embodiment of this application provides a computer program. The computer program includes instructions, and when the computer program is executed by a computer, the computer is enabled to perform the application processing method procedure according to any implementation of the first aspect.

According to a sixteenth aspect, an embodiment of this application provides a computer program. The computer program includes instructions, and when the computer program is executed by a computer, the computer is enabled to perform the application processing method procedure according to any implementation of the second aspect.

According to a seventeenth aspect, an embodiment of this application provides a computer program. The computer program includes instructions, and when the computer program is executed by a computer, the computer is enabled to perform the application processing method procedure according to any implementation of the third aspect.

According to an eighteenth aspect, an embodiment of this application provides a chip system. The chip system includes the application processing apparatus according to any one of the fourth aspect, the fifth aspect, and the sixth aspect, and the chip system is configured to implement functions related to the application processing method procedure according to any implementation of the first aspect. In a possible design, the chip system further includes a memory. The memory is configured to store program instructions and data used to the application processing method. The chip system may include a chip, or may include a chip and another discrete device.

According to a nineteenth aspect, an embodiment of this application provides a chip system. The chip system includes the application processing apparatus according to any implementation of the seventh aspect, and is configured to implement functions related to the application processing method procedure according to any implementation of the second aspect. In a possible design, the chip system further includes a memory. The memory is configured to store program instructions and data used to the application processing method. The chip system may include a chip, or may include a chip and another discrete device.

According to a twentieth aspect, an embodiment of this application provides a chip system. The chip system includes the application processing apparatus according to any implementation of the eighth aspect, and is configured to implement functions related to the application processing method procedure according to any implementation of the third aspect. In a possible design, the chip system further includes a memory. The memory is configured to store program instructions and data used to the application processing method. The chip system may include a chip, or may include a chip and another discrete device.

BRIEF DESCRIPTION OF DRAWINGS

To describe technical solutions in embodiments of this application more clearly, the following describes the accompanying drawings for describing embodiments of this application or the background.

DESCRIPTION OF EMBODIMENTS

Figure 1:
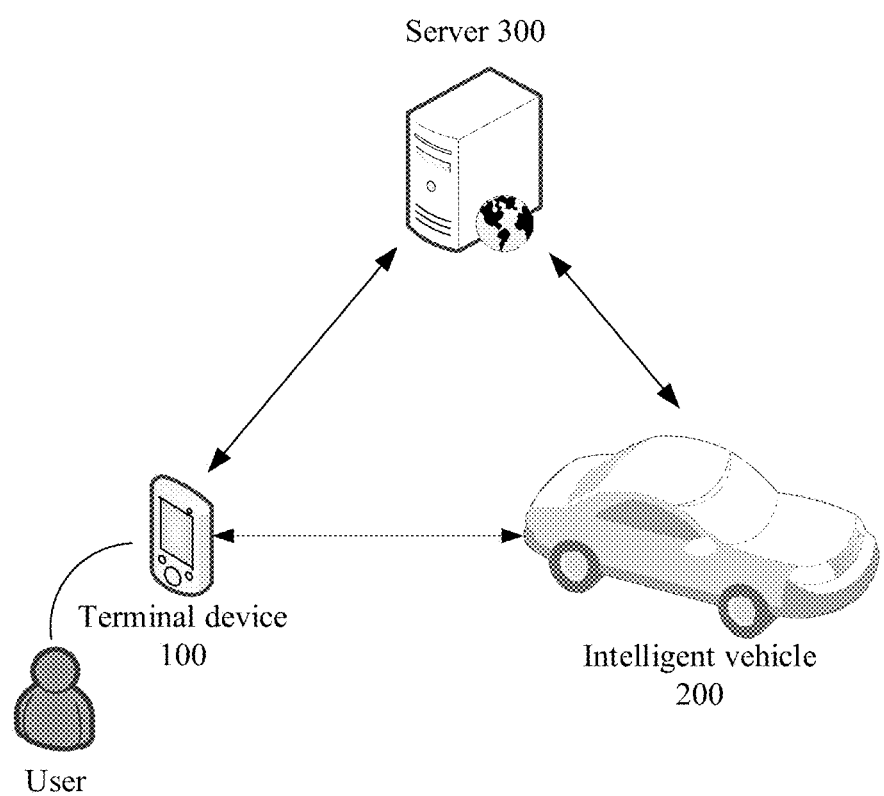
FIG. 1 is a schematic diagram of a system architecture of an application processing method according to an embodiment of this application.

The following describes embodiments of this application with reference to the accompanying drawings in embodiments of this application.

In the specification, claims, and accompanying drawings of this application, the terms "first", "second", "third", "fourth" and the like are intended to distinguish between different objects but are not intended to indicate a particular order. In addition, terms such as "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrases shown in various locations in the specification may not necessarily refer to a same embodiment, and are not independent or optional embodiments exclusive from other embodiments. It is explicitly and implicitly understood by persons skilled in the art that embodiments described in the specification may be combined with another embodiments.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As shown in the figure, both applications running on the terminal device and the terminal device may be components. One or more components may be located within a process and/or a thread of execution, and a component may be located on one computer and/or distributed between two or more computers. In addition, these components may be executed from various computer readable media that store various data structures. The components may perform communication by using a local and/or remote process based on, for example, a signal having one or more data packets (for example, data from two components interacting with another component in a local system, a distributed system, and/or a network such as the Internet interacting with another system through a signal).

Some terms in this application are first described, to help persons skilled in the art have a better understanding.

(1) A bluetooth key means a function of controlling a vehicle through bluetooth of a mobile phone based on a bluetooth connection established to the vehicle when the mobile phone is relatively close to the vehicle. The bluetooth key may be used to complete related operations such as opening/closing a vehicle door, opening/closing a trunk, seeking a vehicle, and starting a vehicle. The bluetooth key may implement main functions of a physical key, to implement more convenient vehicle control operations. A ranging function of the bluetooth key may implement unlocking and locking of the vehicle without an operation performed by a user, for example, automatically unlocking of the vehicle when the mobile phone is two meters away from the vehicle.

(2) A telematics box (T-Box) is an in-vehicle T-Box. An interne of vehicles system includes four parts: a host, an in-vehicle T-Box, a mobile app, and a background system. The in-vehicle T-Box is mainly configured to communicate with the background system and the mobile app to display and control vehicle information of the mobile app. After the user sends a control command through the mobile app, a telematics service platform (TSP) sends a monitoring request instruction to the in-vehicle T-Box. After obtaining the control command, the vehicle sends a control packet through a controller area network (CAN) bus and implement control on the vehicle. Finally, an operation result is fed back to a mobile app of the user. In this way, the user can remotely start the vehicle, turn on an air conditioner, adjust a seat to a proper position, and the like.

To facilitate understanding of embodiments of this application, technical problems to be specifically resolved in this application is further analyzed and proposed. In a conventional technology, there are a plurality of technical solutions for using an application service on a vehicle by a user. The following lists two commonly used solutions as examples.

Solution 1: A user enters a cockpit of a vehicle, opens a central control screen of the vehicle, runs a corresponding in-vehicle application provided by a vehicle vendor by performing an operation on the central control screen, and logs in with an account, and the like, so as to use an ecosystem service in the in-vehicle application.

Disadvantages of Solution 1 are as follows: Before the user enters a seat cabin of the vehicle, a use status of an application being used by the user on a mobile phone cannot be synchronized to the vehicle central control screen. As a result, user experience of automatically taking over an application service on the mobile phone by an application on the in-vehicle central control screen cannot be achieved. According to Solution 1, when the user wants to continue with the use based on the use status of the application on the mobile phone by using the corresponding in-vehicle application, after starting the in-vehicle application, the user usually further needs to perform a corresponding operation on the newly started in-vehicle application based on the current use status of the application on the mobile phone, so as to achieve a use status the same as that on the mobile phone. For example, the user needs to select a same song on the in-vehicle application, adjust volume, set a same play mode (for example, a play mode of looping a list of songs), add a same sound effect, and drag a play progress bar to a corresponding position, and the like, so as to continue with the play on the mobile phone, operations are complex, and experience is poor, causing great inconvenience to the user. In addition, for an application commonly used on the mobile phone by the user, if the vehicle vendor does not provide a corresponding in-vehicle version suitable for use on an in-vehicle central control screen, obviously, in this case, the in-vehicle application on the vehicle usually cannot take over a mobile application, and thus the user cannot continue to use, on the in-vehicle application, a service of the application on the mobile phone.

Solution 2: A user connects a mobile phone to an in-vehicle control screen through a USB data cable, WiFi, or the like, and enables a projection function on the mobile phone through an in-vehicle mobile application desktop such as vehicle entertainment CarPlay or vehicle life CarLife, to project an in-vehicle service screen of the mobile phone onto the in-vehicle control screen for display.

Disadvantages of Solution 2:

1. Before entering a cockpit of the vehicle, the use status of the application being used on the mobile phone by the user cannot be synchronized to the in-vehicle central control screen, and user experience of an automatic application takeover service on the mobile phone and the in-vehicle central control screen cannot be achieved.

2. When the user enters the seat cabin of the vehicle, the user still needs to actively perform an operation, to enable the mobile phone to match the in-vehicle central control screen through a USB data cable or WiFi, and the user actively selects a in-vehicle application on the in-vehicle central control screen. Operations are complex.

In conclusion, the foregoing Solution 1 and Solution 2 cannot meet the following: When the user enters the vehicle, the in-vehicle application on the vehicle is automatically synchronized with a current use status of a mobile application being used on the mobile phone by the user, that is, user experience of automatically taking over a mobile application service by the in-vehicle application on the in-vehicle central control screen cannot be met. Therefore, to resolve a problem that a current application processing technology does not meet an actual service requirement, technical problems to be actually resolved in this application include the following aspects: Based on an existing device, when a user has an intention of entering a vehicle or the user enters the vehicle, an in-vehicle application (for example, a music application or a video application applicable to an intelligent vehicle) corresponding to a mobile application being used on a mobile phone by the user is automatically run, and a use status of the mobile application is automatically synchronized to the in-vehicle application, so that the user may directly continue with the use on the in-vehicle application.

Refer to FIG. 1. FIG. 1 is a schematic diagram of a system architecture of an application processing method according to an embodiment of this application. The technical solutions in embodiments of this application may be specifically implemented in the system architecture shown in FIG. 1 or a similar system architecture. As shown in FIG. 1, the system architecture may include a terminal device 100, an intelligent vehicle 200, and a server 300. The terminal device 100, the intelligent vehicle 200, and the server 300 may establish a connection to each other through a wired or wireless network (for example, wireless-fidelity (WiFi), bluetooth, or a mobile network). The intelligent vehicle 200 may determine a user's intention of entering the vehicle by monitoring a distance between the terminal device 100 and the intelligent vehicle 200, determine whether to run a corresponding in-vehicle application on the intelligent vehicle 200 based on a terminal application running on the terminal device 100, and synchronize a current use status of the terminal application to the in-vehicle application, so that the in-vehicle application automatically takes over a current service of the terminal application, and the user may directly continue with the use of the terminal application on the in-vehicle application after entering the intelligent vehicle 200. For example, play progress of a song or a video on the terminal application can be continued for playing. For another example, channel selection of a radio on the terminal application can be continued for listening.

Figure 2:
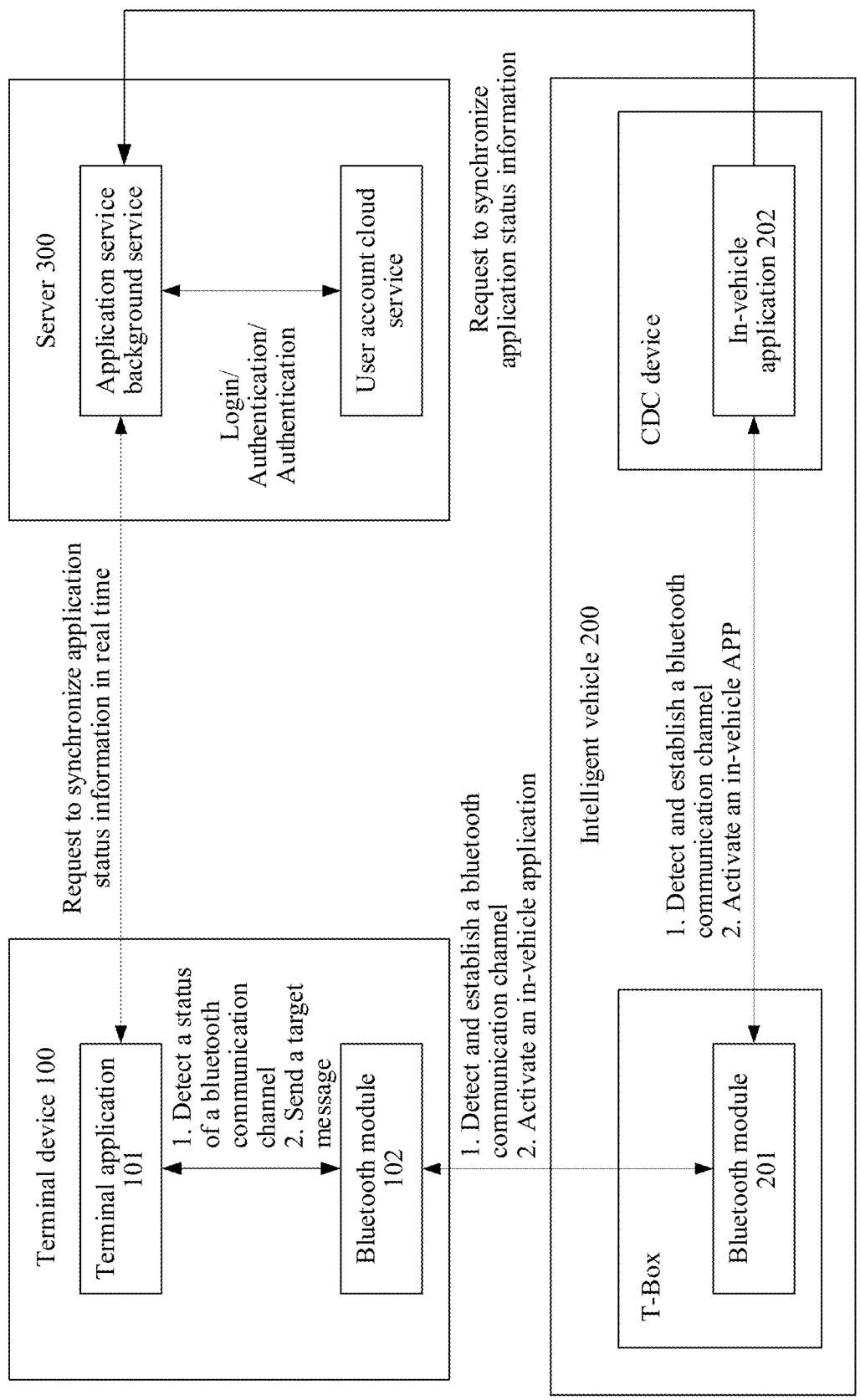
FIG. 2 is a schematic diagram of a system architecture of another application processing method according to an embodiment of this application.

Refer to FIG. 2. FIG. 2 is a schematic diagram of a system architecture of another application processing method according to an embodiment of this application. As shown in FIG. 2, a terminal device 100 may include a terminal application 101 and a bluetooth module 102. An intelligent vehicle 200 may include a T-box and a cockpit domain controller (CDC) device. The T-box may include a bluetooth module 201, and the CDC device may include an in-vehicle application 202. The in-vehicle application 202 may be a version of the terminal application 101 running on the intelligent vehicle 200. A server 300 may be a TSP telematics service platform, and may include an application service background service and a user account cloud service. The terminal device 100 may exchange data with the T-box of the intelligent vehicle 200 through a bluetooth communication protocol, and generally, the two parties need to complete bluetooth matching in advance; the terminal device 100 and the server 300 may exchange data through the hypertext transfer protocol secure over secure socket layer (Https); the server 300 and the CDC device of the intelligent vehicle 200 may exchange data through the HTTPS; the T-box of the intelligent vehicle 200 and the CDC device may exchange data through an in-vehicle Ethernet protocol; and so on. This is not specifically limited in this embodiment of this application.

The following describes in detail an application processing method in embodiments of this application with reference to the system architecture and composition of various parts shown in FIG. 2 by using the terminal device 100, the intelligent vehicle 200, and the server 300 as an example.

Figure 3:
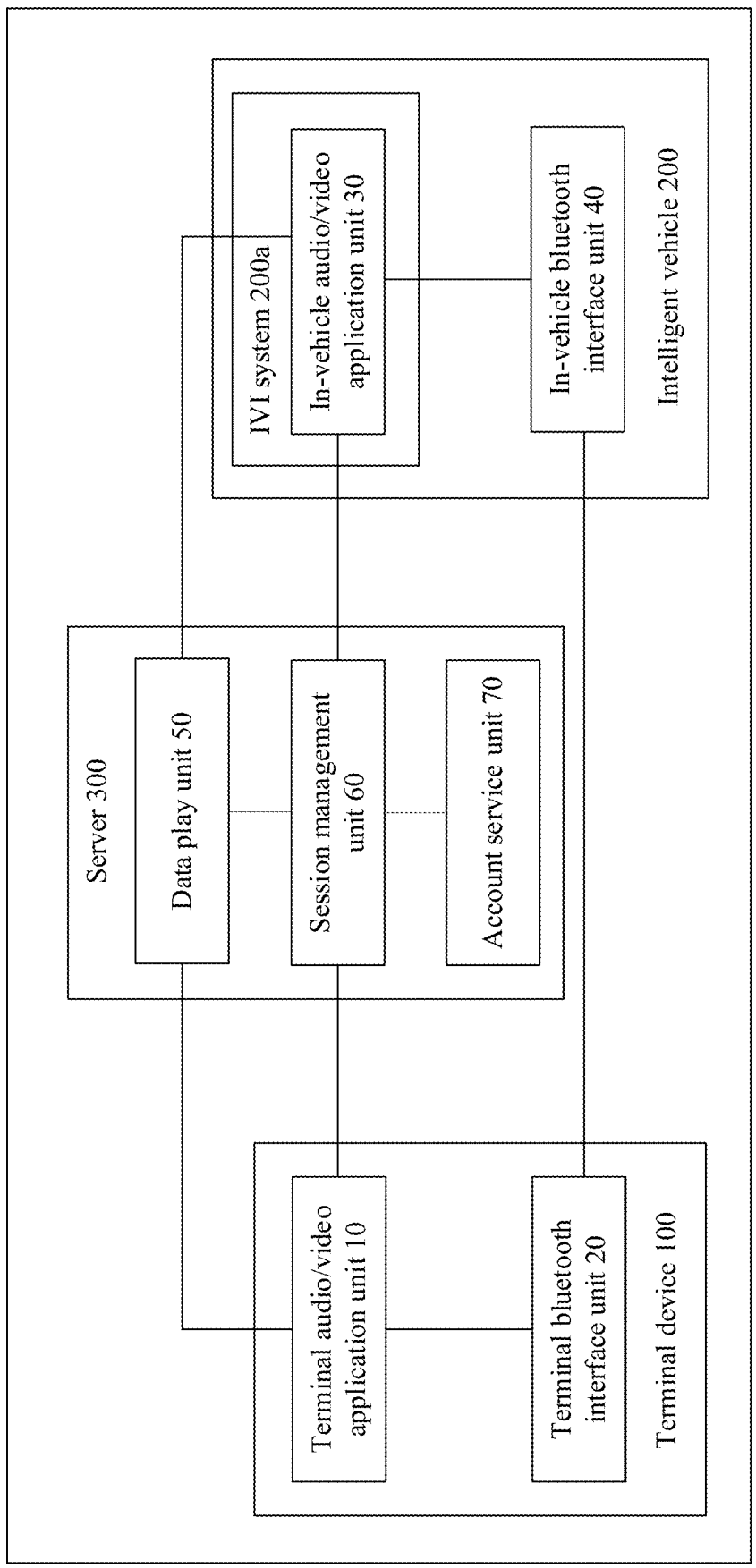
FIG. 3 is a schematic diagram of a system architecture of a method for continuing to play an audio/video application according to an embodiment of this application.

In a process of running a terminal application 101, the terminal device 100 may synchronize status information of the terminal application 101 to the server 300 in real time or at a specific interval (for example, as shown in FIG. 2, the status information of the terminal application 101 may be specifically synchronized to an application service background service of the server 300), and the server 300 stores the status information. Then, when a user carries the terminal device 100 and enters a bluetooth communication range of the intelligent vehicle 200, that is, when the bluetooth module 201 of the intelligent vehicle 200 detects the terminal device 100, the intelligent vehicle 200 may establish a bluetooth connection to the terminal device 100, that is, establish a bluetooth communication channel to the bluetooth module 201 through the bluetooth module 102 shown in FIG. 2. When the terminal device 100 detects that the bluetooth communication channel has been established, the terminal device 100 may send target information to the intelligent vehicle 200 through the bluetooth communication channel. The target information may include, for example, name information and account information of the running terminal application 101. In addition, after the bluetooth communication channel is established, the intelligent vehicle 200 may monitor a distance between the terminal device 100 and the intelligent vehicle 200 through the bluetooth module 201. When the distance is less than a specific threshold (for example, 3 m or 4 m), it may be considered that the user has an intention of entering the vehicle. The intelligent vehicle 200 may start a CDC device, run a corresponding in-vehicle application 202 based on received name information, and log in to the in-vehicle application 202 based on the received account information through the user account cloud service shown in FIG. 2, to maintain login to the terminal application 101 and the in-vehicle application 202 with a same account. Further, when the intelligent vehicle 200 detects that the distance between the terminal device 100 and the intelligent vehicle 200 is less than another threshold (for example, 1 m or 2 m), or detects that the terminal device 100 enters the intelligent vehicle 200, the intelligent vehicle 200 may obtain a current use status of the terminal application 101 from the server 300 (as shown in FIG. 3, specifically from the application service background service of the server 300) based on the received name information and account information, and synchronize the use status to the in-vehicle application 202. Therefore, after entering the intelligent vehicle 200, the user may directly continue with the use of the terminal application 101 on the in-vehicle application 202, thereby greatly reducing user operations and improving user experience. Further, the intelligent vehicle 200 may further request the terminal device 100 through the bluetooth communication channel to exit the terminal application 101, so that the in-vehicle application 202 completely takes over a current service of the terminal application 101, thereby reducing power consumption and the like of the terminal device 100. This is not specifically limited in this embodiment of this application.

In some possible implementations, for example, when the intelligent vehicle 200 detects that the distance between the terminal device 100 and the intelligent vehicle 200 is less than 3 m, the intelligent vehicle may also start the CDC device in the vehicle, run the corresponding in-vehicle application 202 on the CDC device, and synchronize the current use status of the terminal application 101 to the in-vehicle application 202, so that the in-vehicle application 202 can automatically takes over the current service of the terminal application 101 in advance when the user is about to enter the vehicle or the user just enters the vehicle, or the like. This is not specifically limited in this embodiment of this application. In some possible implementations, considering that it usually takes a specific time for the intelligent vehicle 200 to start the in-vehicle CDC device and run the corresponding in-vehicle application 202, and even takes approximately 20 s or 30 s in some low-end vehicles with poor performance or mid-end vehicles, the intelligent vehicle 200 may also start the in-vehicle CDC device after establishing a bluetooth connection to the terminal device 100, run the corresponding in-vehicle application 202 on the CDC device based on the received name information and account information of the terminal application 101 running on the terminal device 100, and synchronize the current use status of the terminal application 101 to the in-vehicle application 202 when it is detected that the distance between the terminal device 100 and the intelligent vehicle 200 is less than 3 m or 2 m, and so on. This is not specifically limited in this embodiment of this application.

In conclusion, the terminal device 100 may be a smartphone, a smart wearable device, a tablet computer, a notebook computer, a desktop computer, or the like that has the foregoing functions. The intelligent vehicle 200 may be a sedan car, a van, a bus, a taxi, a motorcycle, a yacht, or the like that has the foregoing functions. This is not specifically limited in this embodiment of this application. The server 300 may be a computer, a server, or the like that has the foregoing functions. The server 300 may be a server, a server cluster including a plurality of servers, or a cloud computing service center. The server 300 may provide a background service for the terminal device 100 and the intelligent vehicle 200, and is for example, a TSP telematics service platform. This is not specifically limited in this embodiment of this application.

Refer to FIG. 3. FIG. 3 is a schematic diagram of a system architecture of a method for continuing to play an audio/video application according to an embodiment of this application. As shown in FIG. 3, the system architecture may include a terminal device 100, an intelligent vehicle 200, and a server 300. The terminal device 100 may include a terminal audio/video application unit 10 (which may be, for example, relatively common music and video play application software in a market) and a terminal bluetooth interface unit 20. The intelligent vehicle 200 may include a vehicle equipment 200*a* and an in-vehicle bluetooth interface unit 40. The vehicle equipment 200*a* may include an in-vehicle audio/video application unit 30 (which may be, for example, an in-vehicle version of relatively common music and video play application software in a market). The vehicle equipment 200*a* (which may also be the foregoing CDC device) is generally an HMI (Human-Machine Interaction) device in a vehicle cockpit, and usually includes a central control display screen and the like. The server 300 may include a data play unit 50, a session management unit 60, and an account service unit 70.

The terminal audio/video application unit 10 is responsible for providing an audio/video service of the terminal device 100 to a user, performing information interaction with the user, and receiving input of the user; receiving a request for logging in to the account service unit 70 by the user; and receiving session data of using the audio/video service of the terminal by the user, and sending the session data to the session management unit 60.

The terminal bluetooth interface unit 20 is responsible for receiving an instruction of the in-vehicle bluetooth interface unit 40, and transmitting application information and account data of the terminal audio/video application unit 10 to the vehicle equipment 200*a* through a bluetooth protocol.

The vehicle equipment 200*a* is responsible for receiving the instruction of the in-vehicle bluetooth interface unit 40, selecting the in-vehicle audio/video application unit 30 based on the received application information and account data of the terminal audio/video application unit 50, and performing running and login with an account.

The in-vehicle audio/video application unit 30 is responsible for providing an audio/video service of the vehicle equipment 200a to the user, exchanging information with the user, and receiving input of the user; receiving a request for logging in to the account service unit 70; and receiving session data of using the in-vehicle audio/video service by the user, and sending the session data to the session management unit 60.

The in-vehicle bluetooth interface unit 40 is responsible for detecting the terminal device 100 that establishes a bluetooth connection to the intelligent vehicle 200 through the in-vehicle bluetooth interface unit 40, and controlling the vehicle equipment 200a to select and run the in-vehicle audio/video application unit 30.

The data play unit 50 is responsible for receiving an audio/video play request of the session management unit 60, and sending audio/video data to the terminal audio/video application unit 10 and the in-vehicle audio/video application unit 30 for playing.

The session management unit 60 is responsible for initializing an information transmission channel between the terminal audio/video application unit 10, the in-vehicle audio/video application unit 30, the account service unit 70, and the data play unit 50.

The account service unit 70 is responsible for receiving account login authentication information of the terminal audio/video application unit 10 and the in-vehicle audio/video application unit 30 forwarded by the session management unit 60, and is responsible for login to the terminal audio/video application unit 10 and the in-vehicle audio/video application unit 30 with a same account.

It should be understood that the shown structure in this embodiment of this application does not constitute a specific limitation on the terminal device 100, the intelligent vehicle 200, and the server 300. The terminal device 100, the intelligent vehicle 200, and the server 300 may have more or fewer components than those shown in FIG. 2 or FIG. 3, may combine two or more components, or split some components, or may have different component configurations, or the like. Various components shown in FIG. 2 or FIG. 3 may be implemented in hardware including one or more signal processing and/or application-specific integrated circuits, or software, or a combination of hardware and software.

Figure 4:
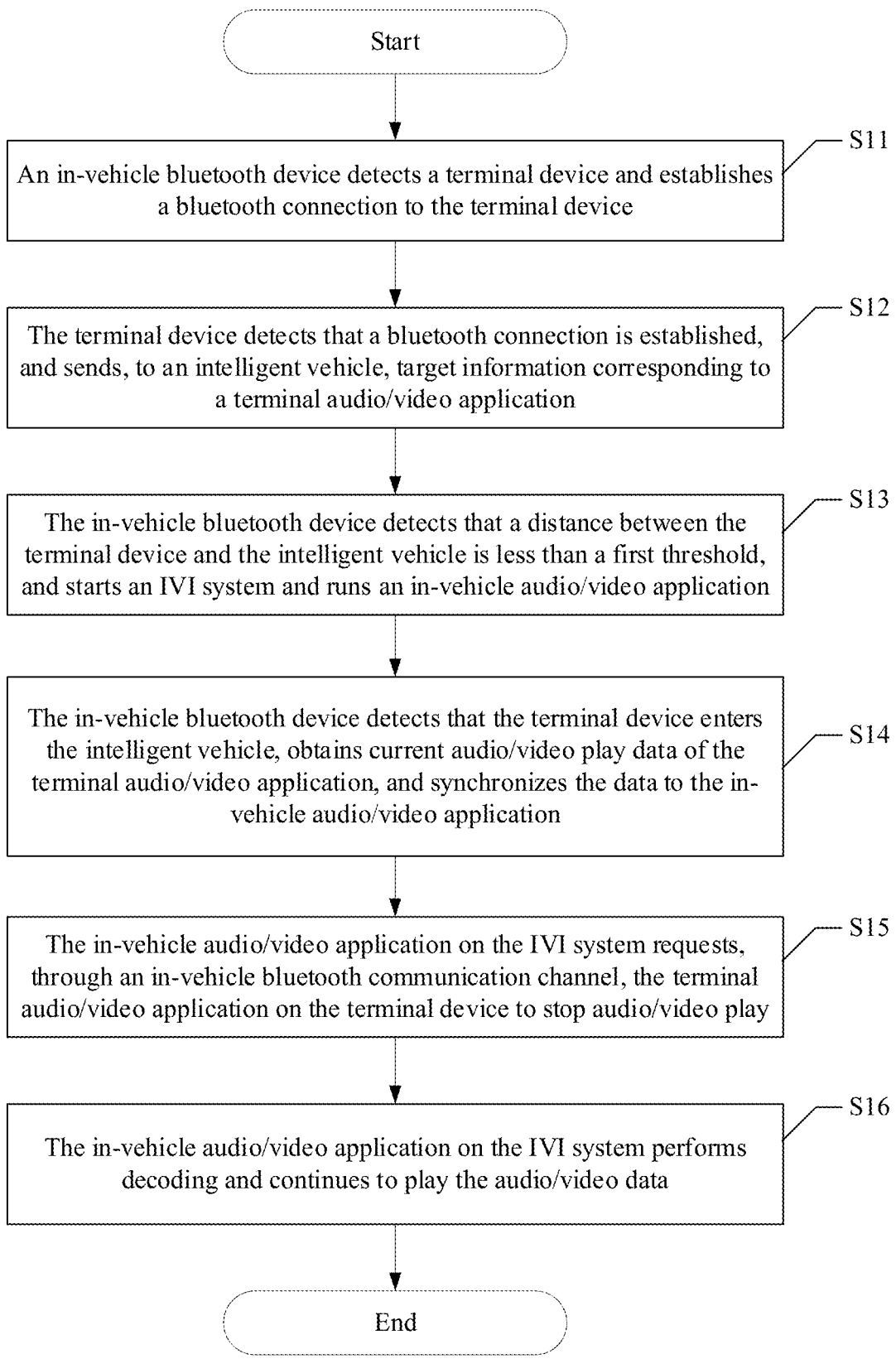
FIG. 4 is a schematic flowchart of a method for continuing to play an audio/video application according to an embodiment of this application.

Refer to FIG. 4. FIG. 4 is a schematic flowchart of a method for continuing to play an audio/video application according to an embodiment of this application. The method may be applied to the system architecture shown in FIG. 3. With reference to the system architecture shown in FIG. 3 and the method flowchart shown in FIG. 4, the following describes in detail this embodiment of this application by using a terminal audio/video application and an in-vehicle audio/video application as examples. The method may include the following step S11 to step S16.

Step S11: An in-vehicle bluetooth device detects a terminal device, and establishes a bluetooth connection to the terminal device. Optionally, before step S11, a prerequisite thereof may be that bluetooth matching between the in-vehicle bluetooth device and the terminal device is completed. The in-vehicle bluetooth device is in a detection state, and when the terminal device enables bluetooth and is within a bluetooth communication range of the in-vehicle bluetooth interface unit 40 shown in FIG. 3 (for example, when a distance between the terminal device and the in-vehicle bluetooth interface unit 40 is approximately 10 m), a bluetooth communication channel is established between the in-vehicle bluetooth interface unit 40 and the terminal bluetooth interface unit 20 of the terminal device shown in FIG. 3.

Step S12: The terminal device detects that a bluetooth connection is established, and sends, to the intelligent vehicle, target information corresponding to a terminal audio/video application. Optionally, the target information may include application name information, account information, and the like of the terminal audio/video application, and may further include information about a song currently played by the terminal audio/video application, and the like. Optionally, as shown in FIG. 3, if the terminal audio/video application unit 10 on the terminal device detects that the bluetooth communication channel between the intelligent vehicle and the terminal device has been connected, the terminal audio/video application unit 10 may send, to the intelligent vehicle through the bluetooth communication channel, the name information corresponding to the terminal audio/video application and information about a currently logged-in account.

Step S13: The in-vehicle bluetooth device detects that a distance between the terminal device and the intelligent vehicle is less than a first threshold, starts a vehicle equipment, and runs an in-vehicle audio/video application. Optionally, when the in-vehicle bluetooth interface unit 40 shown in FIG. 3 detects that the distance between the terminal device and the intelligent vehicle is less than the first threshold (for example, less than 3 m), the in-vehicle bluetooth interface unit 40 wakes up a vehicle equipment 200a, and sends, to the vehicle equipment 200a, a notification of running an in-vehicle audio/video application unit 30 in the vehicle equipment 200a. After receiving the notification, the vehicle equipment 200a runs the in-vehicle audio/video application unit 30 on the vehicle equipment 200a. The in-vehicle audio/video application unit 30 initiates account login authentication to an account service unit 70 based on the received account information, to complete the login.

Step S14: The in-vehicle bluetooth device detects that the terminal device enters the intelligent vehicle, obtains current audio/video play data of the terminal audio/video application, and synchronizes the data to the in-vehicle audio/video application. When the in-vehicle bluetooth interface unit 40 detects that the terminal device is already in a cockpit of the intelligent vehicle, the in-vehicle audio/video application unit 30 may obtain the current audio/video play data of the terminal audio/video application unit 10 from the session management unit 60. Optionally, when the in-vehicle bluetooth interface unit 40 detects that the distance between the terminal device and the intelligent vehicle is 1 m or 0.5 m, the in-vehicle audio/video application unit 30 may also obtain the current audio/video play data of the terminal audio/video application unit 10 from the session management unit 60.

Step S15: The in-vehicle audio/video application on the vehicle equipment requests, through the in-vehicle bluetooth communication channel, the terminal audio/video application on the terminal device to stop audio/video play. Optionally, the in-vehicle audio/video application unit 30 shown in FIG. 3 requests, through the session management unit 60, to stop audio/video play of the terminal audio/video application unit 10, or requests the terminal device to exit the terminal audio/video application.

Step S16: The in-vehicle audio/video application on the vehicle equipment performs decoding and continues to play the audio/video data. The in-vehicle audio/video application unit 30 receives the current audio/video data of the terminal audio/video application unit 10 sent by the data play unit 50, and continues to play the audio/video data after the decoding.

To help understand embodiments of this application, the following lists example application scenarios to which an application processing method in this application is applicable. The following scenarios may be included.

Scenario 1: An intelligent vehicle monitors a distance between a terminal device and the intelligent vehicle, and determines whether to run a corresponding in-vehicle application on the intelligent vehicle based on a distance change, and whether the in-vehicle application takes over a terminal application running on the terminal device.

Figure 5:
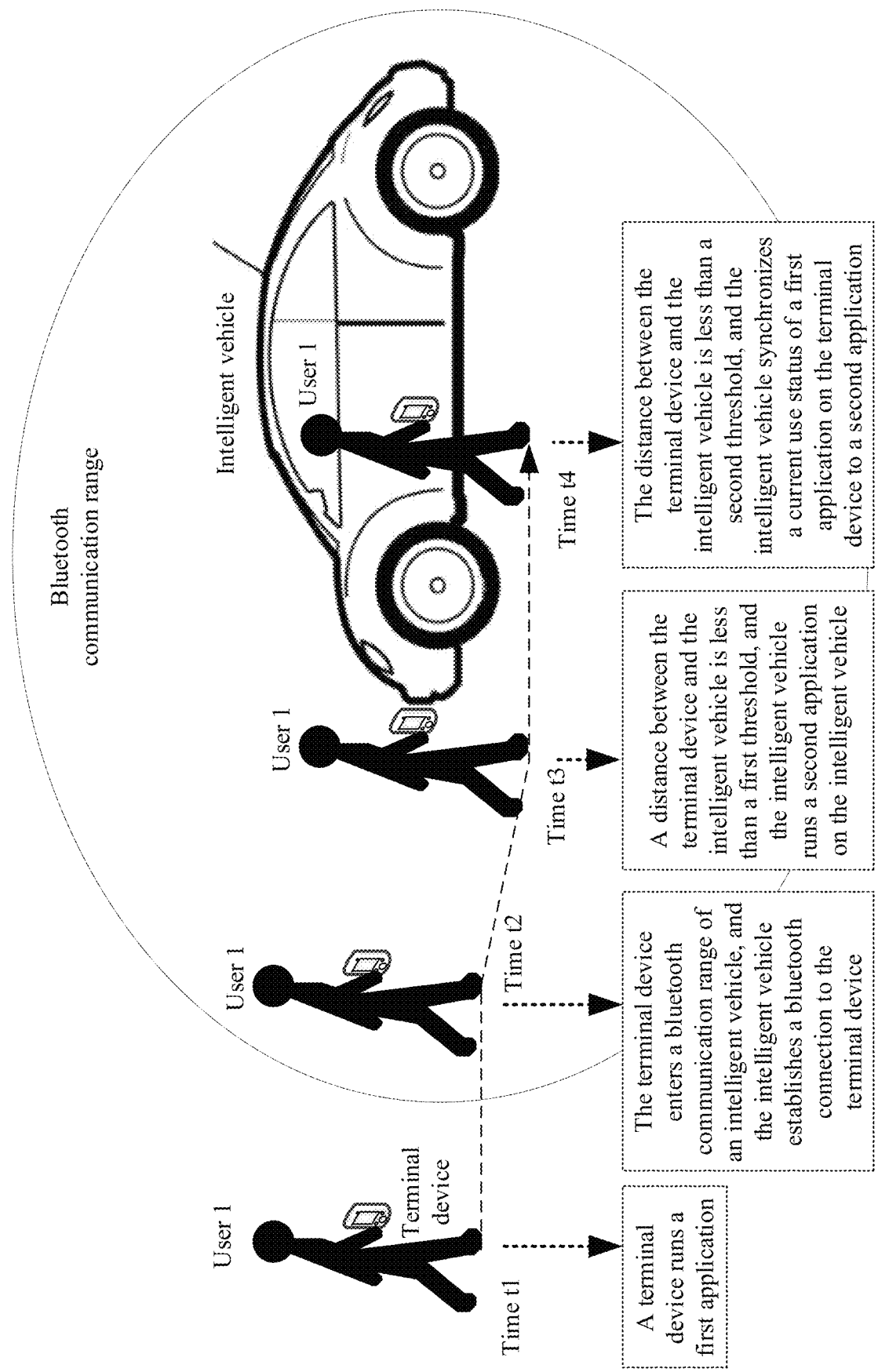
FIG. 5 is a schematic diagram of an application scenario of an application processing method according to an embodiment of this application.

Refer to FIG. 5. FIG. 5 is a schematic diagram of an application scenario of an application processing method according to an embodiment of this application. As shown in FIG. 5, the application scenario may include a terminal device (a smartphone is used as an example in FIG. 5) and an intelligent vehicle (a sedan car is used as an example in FIG. 5). The terminal device and the intelligent vehicle each may include a related display, a processor, a memory, and the like. The display, the processor, and the memory may transmit data through a system bus. As shown in FIG. 5, user 1 holds the terminal device with a hand. In this case, a first application (for example, a relatively common mobile phone music application in a market) runs on the terminal device, and the terminal device may synchronize a use status (for example, song play progress, a song name, a sound effect, volume, and a current playlist) of the first application to a server (which is not shown in FIG. 5, and may be, for example, a background server of the first application) in real time. As shown in FIG. 5, at a time t2, the terminal device enters a bluetooth communication range of the intelligent vehicle. In this case, the intelligent vehicle detects the terminal device that pre-matches the intelligent vehicle, and the intelligent vehicle establishes a bluetooth connection to the terminal device. Then, the intelligent vehicle continuously monitors a distance between the terminal device and the intelligent vehicle based on the bluetooth connection. As shown in FIG. 5, at a time t3, the intelligent vehicle detects that the distance between the terminal device and the intelligent vehicle is less than a first threshold (for example, 3 m), and the intelligent vehicle may run a corresponding second application on the vehicle. The second application may be a version (for example, a relatively common in-vehicle music application in a market) of the first application running on the intelligent vehicle. When the distance between the terminal device and the intelligent vehicle is further reduced, as shown in FIG. 5, at a time t4, the intelligent vehicle detects that the distance between the terminal device and the intelligent vehicle is less than a second threshold (for example, 1 m). In this case, the intelligent vehicle may obtain a current use status of the first application on the terminal device from the server, and synchronize the current use status of the first application on the terminal device to the second application on the intelligent vehicle. In this way, experience of automatically synchronizing and switching the application use status between the terminal device and the intelligent vehicle is achieved. After entering the intelligent vehicle, the user may directly continue, on the second application in the synchronized use status, with the use of the first application on the terminal device, thereby reducing user operations and improving user experience.

Figure 6A:
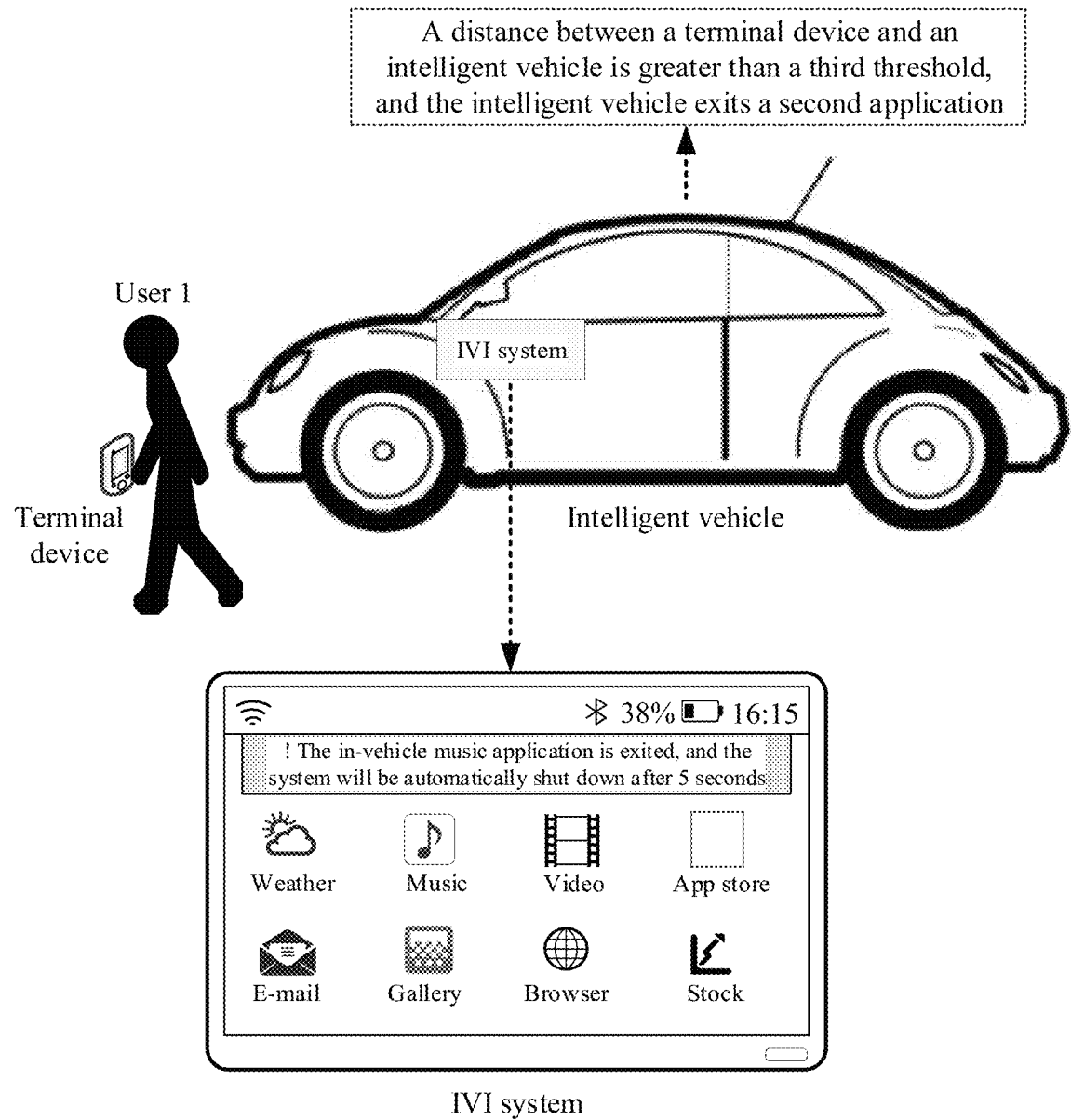
FIG. 6a to FIG. 6e are schematic diagrams of a group of application scenarios according to an embodiment of this application.

Refer to FIG. 6a to FIG. 6e. FIG. 6a to FIG. 6e are schematic diagrams of a group of application scenarios according to an embodiment of this application. Optionally, as shown in FIG. 6a, after a user enters an intelligent vehicle for a period of time, when the user stands up and leaves the intelligent vehicle, and the intelligent vehicle detects that a distance between a terminal device and the intelligent vehicle is greater than a third threshold (for example, 2 m), the intelligent vehicle may exit a second application running on a vehicle equipment, and close the vehicle equipment (for example, automatic shutdown after 5 seconds shown in FIG. 6a), to reduce energy consumption of the vehicle equipment.

Figure 6B:
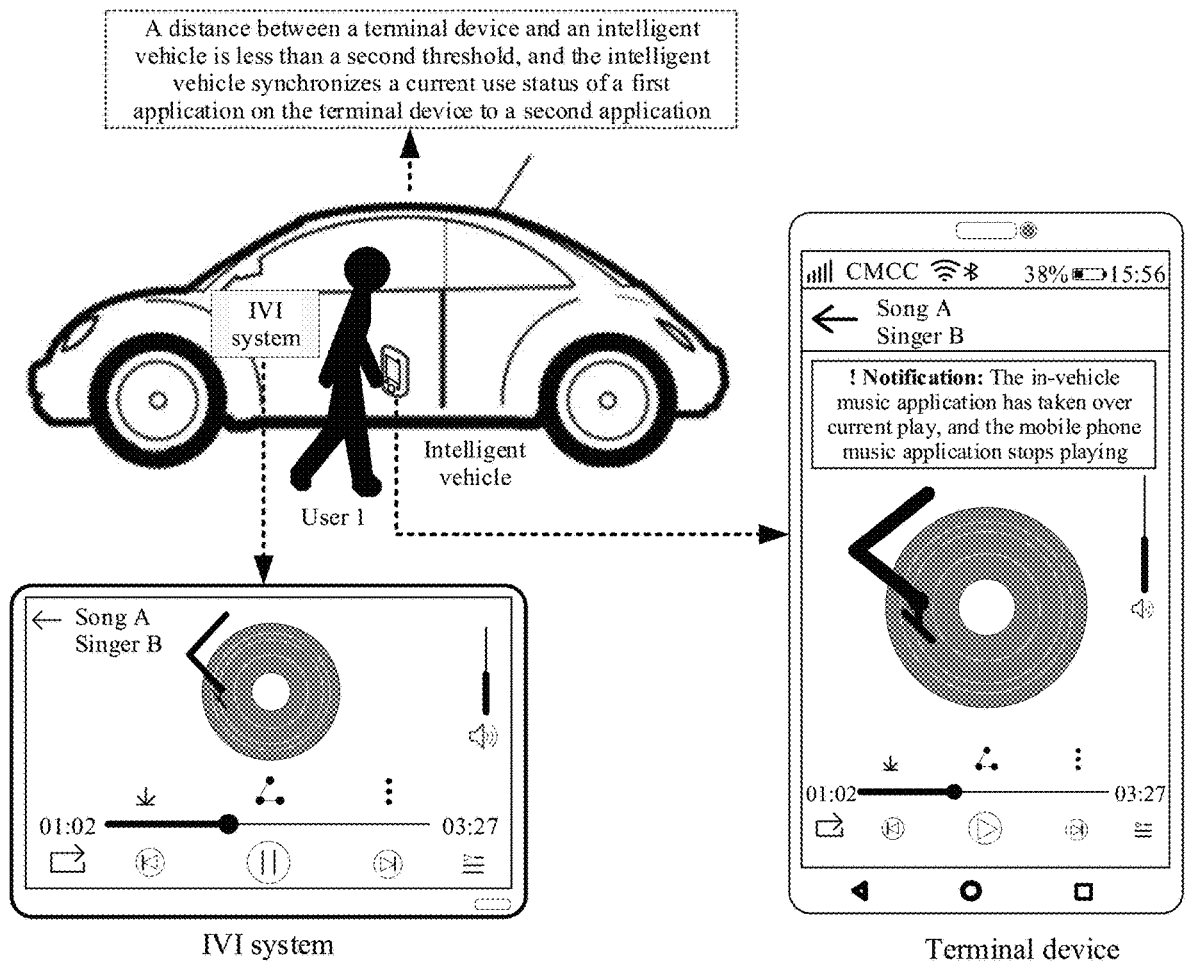

Optionally, as shown in FIG. 6b, as described above, when the intelligent vehicle detects that the distance between the terminal device and the intelligent vehicle is less than a second threshold, the intelligent vehicle synchronizes a current use status of a first application (a mobile phone music application is used as an example in FIG. 6b) on the terminal device to the second application (an in-vehicle music application is used as an example in FIG. 6b) on the vehicle. As shown in the vehicle equipment and the terminal device in FIG. 6b, the synchronized use status may include a series of song information such as a song name, a singer name, and song play progress, and may further include volume, a sound effect, a play mode (which may be, for example, a single-song play mode, a play mode of looping a list of songs, or a random play mode), a playlist, and the like. As shown in FIG. 6b, the in-vehicle music application on the vehicle equipment continues, based on the current use status of the mobile phone music application, to play a song A from 1:02. Optionally, after the in-vehicle music application synchronizes and takes over current play of the mobile phone music application, the intelligent vehicle may request the terminal device based on the established bluetooth connection to stop playing. As shown in FIG. 6b, the terminal device has stopped playing, and may remind, through a text on a notification bar, the user that the in-vehicle music application has taken over current play, and the mobile phone music application stops playing, and so on. This is not specifically limited in this embodiment of this application.

Figure 6C:
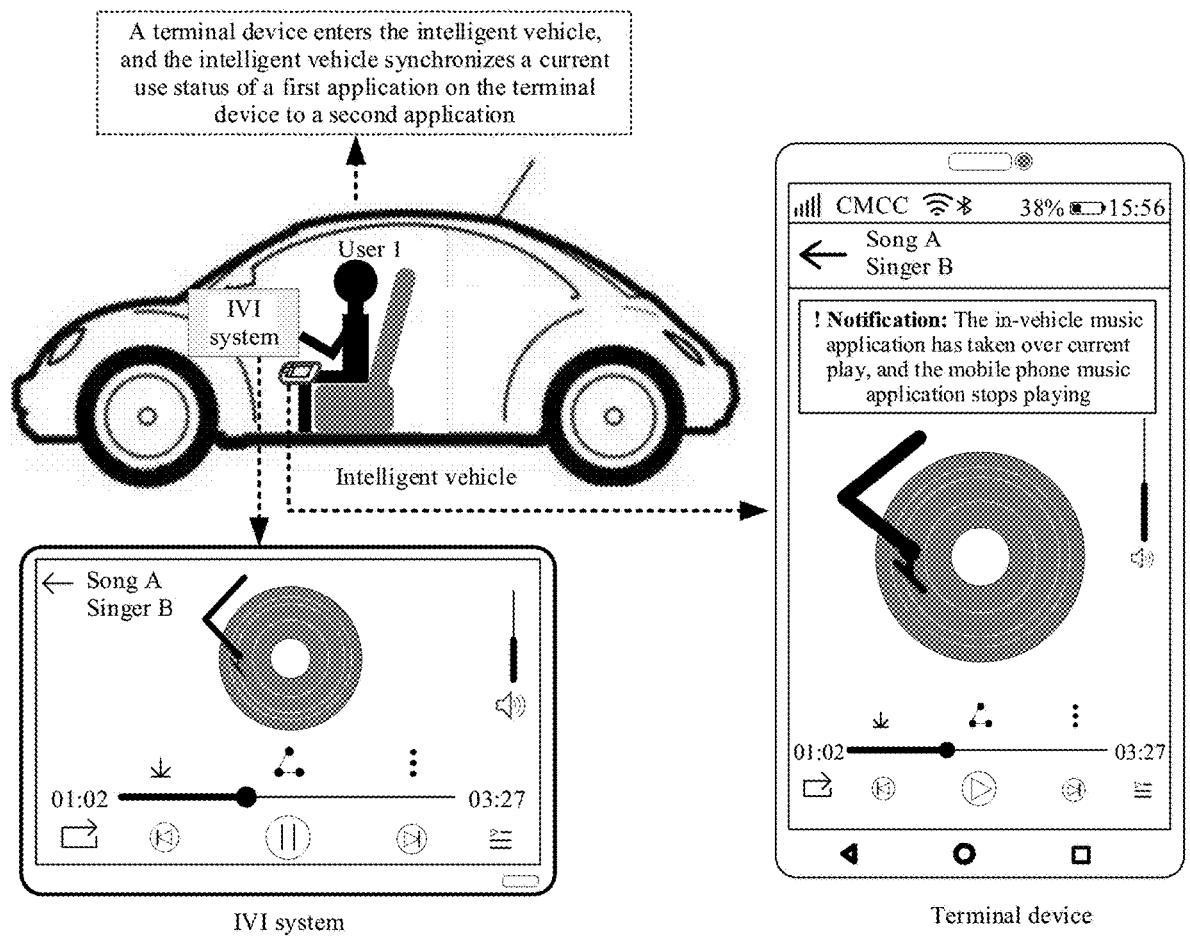

Optionally, as shown in FIG. 6c, alternatively when detecting that the terminal device enters the intelligent vehicle, the intelligent vehicle may synchronize the current use status of the first application (the mobile phone music application is used as an example in FIG. 6c) on the terminal device to the second application (the in-vehicle music application is used as an example in FIG. 6c) on the vehicle, and so on. This is not specifically limited in this embodiment of this application.

Figure 6D:
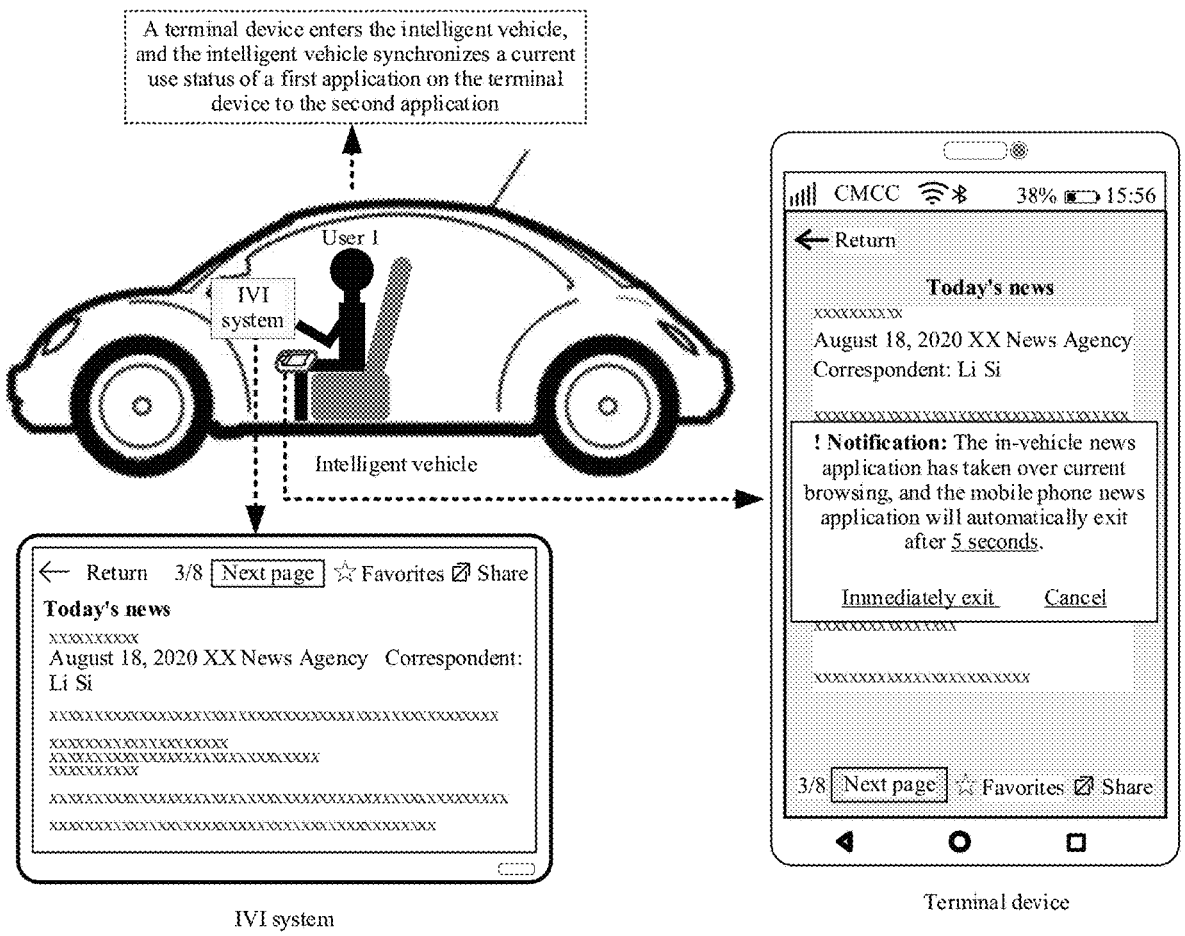

Optionally, as shown in FIG. 6d, when detecting that the terminal device enters the intelligent vehicle, the intelligent vehicle may synchronize the current use status of the first application (the mobile phone news application is used as an example in FIG. 6d) on the terminal device to the second application (the in-vehicle news application is used as an example in FIG. 6d) on the vehicle. As shown in the vehicle equipment and the terminal device in FIG. 6d, the synchronized use status may include a browsed article, an article page number, a browsing location on a specific page, and the like. As shown in FIG. 6d, the in-vehicle news application on the vehicle equipment displays same article content with a same page number at a same browsing location based on the current use status of the mobile phone news application. Optionally, after the in-vehicle news application synchronizes and takes over current news browsing of the mobile phone news application, the intelligent vehicle may request the terminal device based on the established bluetooth connection to exit the mobile phone news application. As shown in FIG. 6d, the terminal device reminds, through a text on a notification bar, the user that the in-vehicle news application has taken over current browsing, and the mobile phone news application will automatically exit after 5 seconds. Optionally, as shown in FIG. 6d, the user may alternatively choose to immediately exit, cancel the exit, or the like, as chosen by the user. This is not specifically limited in this embodiment of this application.

Figure 6E:
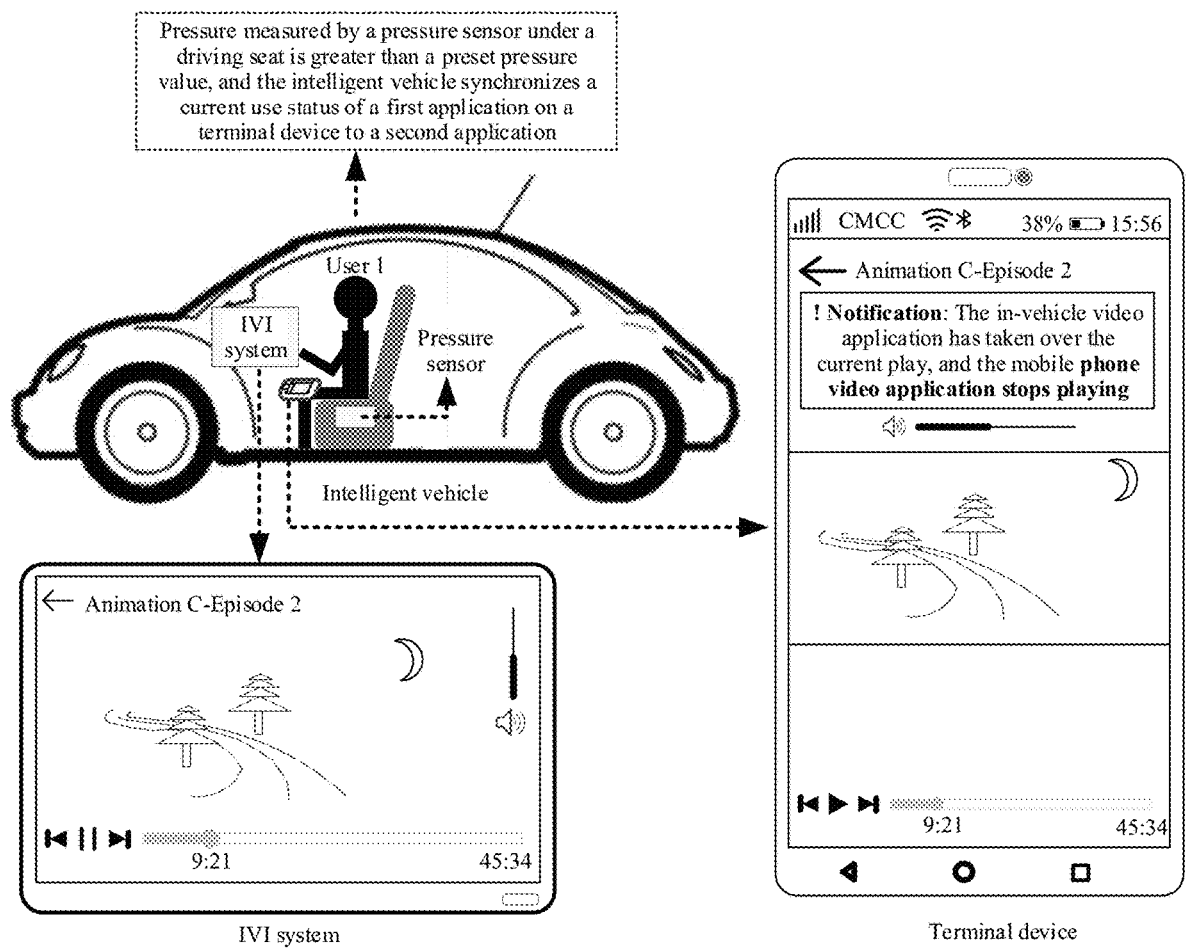

Optionally, as shown in FIG. 6e, alternatively when detecting that pressure measured by a pressure sensor under a driving seat is greater than a preset pressure value, the intelligent vehicle may synchronize the current use status of the first application (a mobile phone video application is used as an example in FIG. 6e) on the terminal device to the second application (an in-vehicle video application is used as an example in FIG. 6e). As shown in the vehicle equipment and the terminal device in FIG. 6e, the synchronized use status may include a video name, the quantity of episodes, video play progress, volume, and the like. As shown in FIG. 6e, the in-vehicle video application on the vehicle equipment continues, based on a current use status of the mobile phone video application, to play episode 2 of an animation C from 9:21. Optionally, after the in-vehicle video application synchronizes and takes over current play of the mobile phone video application, the intelligent vehicle may request the terminal device based on the established bluetooth connection to stop playing. As shown in FIG. 6e, the terminal device has stopped playing, and may remind, through a text on a notification bar, the user that the in-vehicle video application has taken over current play, and the mobile phone video application stops playing, and so on. This is not specifically limited in this embodiment of this application.

Figure 7A:
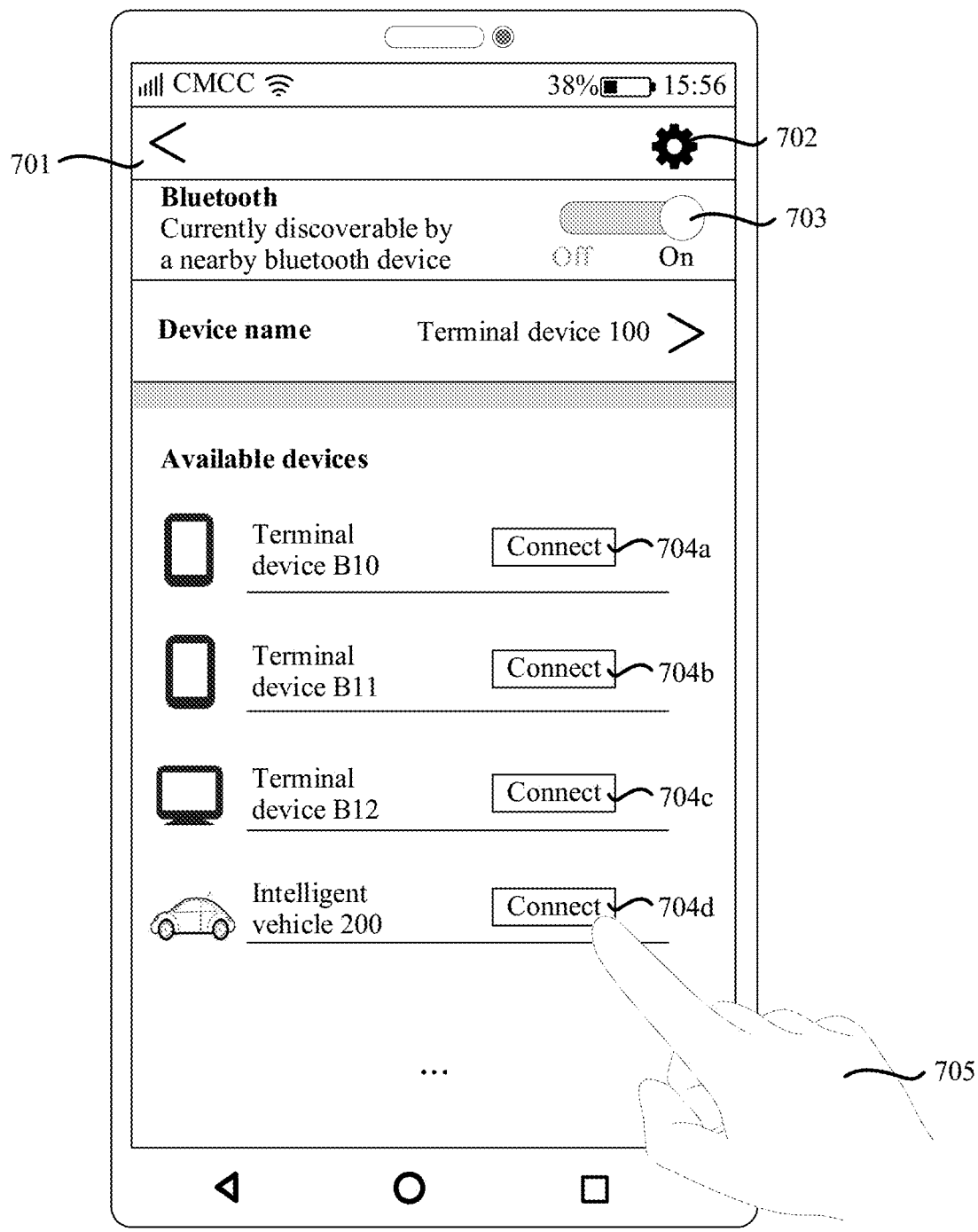
FIG. 7a to FIG. 7b are schematic diagrams of a group of interfaces according to an embodiment of this application.
Figure 7B:
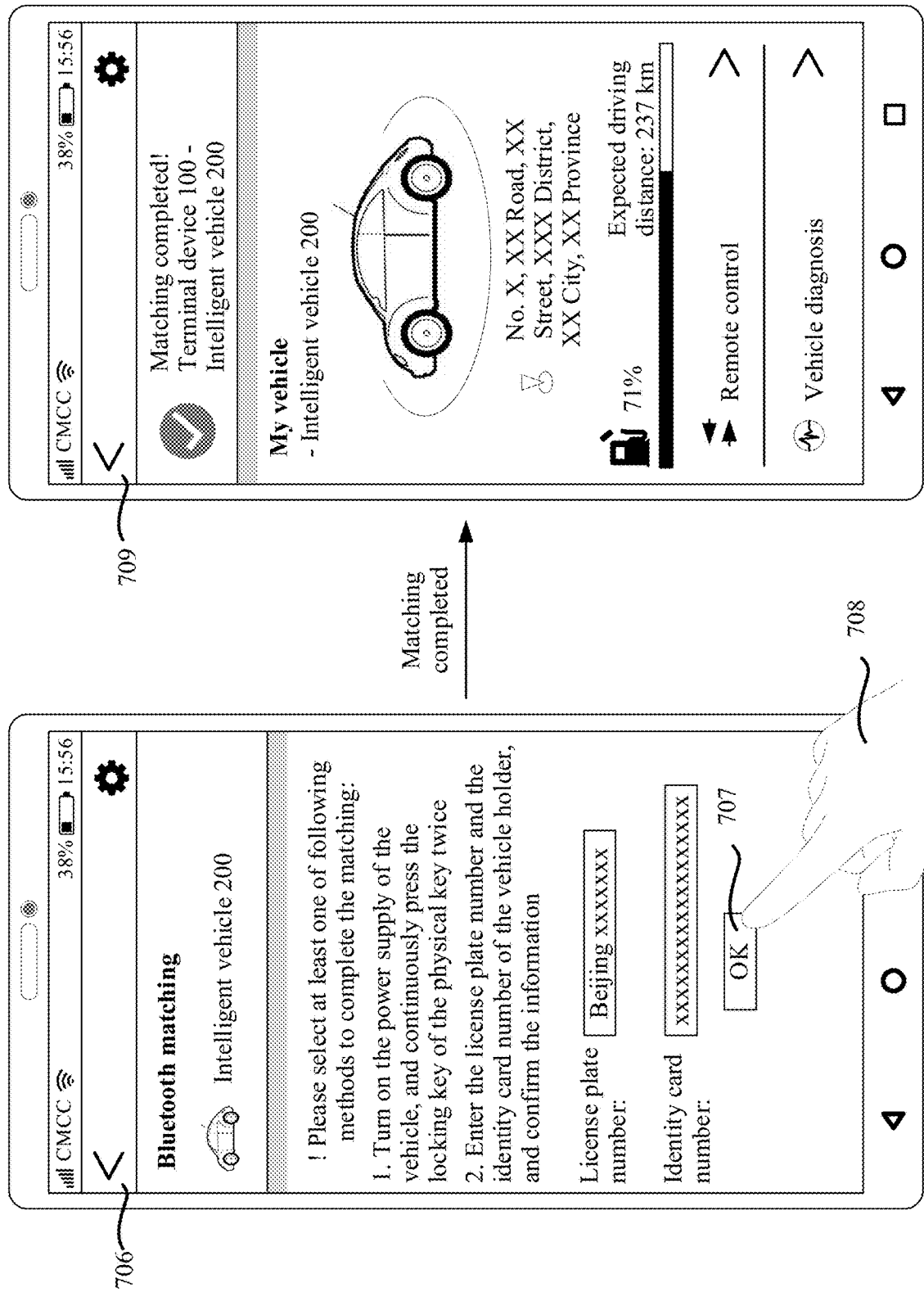

As described above, it should be noted that a prerequisite for establishing the bluetooth connection between the intelligent vehicle and the terminal device and measuring the distance based on the bluetooth connection is that the terminal device of the user needs to pre-match the intelligent vehicle, so as to ensure unique binding between the terminal device of the user and the intelligent vehicle, thereby maintaining property security of the user, preventing interaction between another terminal device and the intelligent vehicle of the user, and preventing harming user interests. In this embodiment of this application, when the user wants to perform matching and binding between the terminal device of the user and the intelligent vehicle so that the intelligent vehicle subsequently performs an application processing method in this application on the terminal device, for a process of operating the terminal device by the user, refer to FIG. 7a and FIG. 7b. FIG. 7a and FIG. 7b are schematic diagrams of a group of interfaces according to an embodiment of this application. As shown in FIG. 7a, the terminal device displays a bluetooth connection interface 701. The bluetooth connection interface 701 may include a setting control 702, a bluetooth on/off control 703, and another control (for example, a return control). As shown in FIG. 7a, a device name of the terminal device may be a terminal device 100. As shown in FIG. 7a, after the user enables bluetooth of the terminal device, the terminal device may detect and display nearby available devices (that is, devices that can establish a bluetooth connection to the terminal device), which include, for example, a terminal device B10, a terminal device B11, a terminal device B12, and an intelligent vehicle 200 shown in FIG. 7a, and the like. As shown in FIG. 7a, the bluetooth connection interface 701 may further include a connection control 704a of the second device B10, a connection control 704b of the second device B11, a connection control 704c of the second device B12, and a connection control 704d of the intelligent vehicle 200. For example, as shown in FIG. 7a, when the user wants to perform bluetooth matching with the intelligent vehicle 200 to complete bluetooth key activation, the user may establish a connection between the terminal device and the intelligent vehicle 200 by using an input operation 705 (for example, tapping the connection control 704d of the intelligent vehicle 200), to trigger subsequent bluetooth matching. In this case, as shown in FIG. 7b, after the user taps the connection control 704d of the intelligent vehicle 200, the terminal device may display a bluetooth matching interface 706 between the terminal device and the intelligent vehicle 200. Matching is completed based on matching operation indication information displayed in the bluetooth matching interface 706. For example, as shown in FIG. 7b, the user may select the method 2, correctly fill a license plate number of the intelligent vehicle owned by the user and an identity card number, and complete unique matching between the terminal device and the intelligent vehicle by using an input operation 708 (for example, tapping a confirmation control 707). In this case, the terminal device may display an intelligent vehicle control interface 709 obtained after the matching is completed. In this way, bluetooth key activation is completed. The terminal device may be used as a "key" of the intelligent vehicle, to implement a corresponding function of a physical key of the intelligent vehicle, for example, unlocking/locking a vehicle door, starting the vehicle, opening/closing a trunk, and raising/lowering a vehicle window. Optionally, vehicle positioning shown in the intelligent vehicle control interface 709 in FIG. 7b, that is, a vehicle seeking function, and remote control (for example, self-driving) and a vehicle diagnosis function shown in the intelligent vehicle control interface 709 may be further implemented. As described above, a ranging function of a bluetooth key may unlock and lock the vehicle without an operation performed by the user, for example, may automatically unlock the vehicle when a distance between the mobile phone the vehicle is 2 m, and may automatically run an in-vehicle application on the vehicle when the distance between the mobile phone and the vehicle is 3 m, and automatically synchronize a use status of a corresponding mobile application to the in-vehicle application when the distance between the mobile phone and the vehicle is 1 m, so as to implement experience of automatically synchronizing and switching the application use status between the terminal device and the intelligent vehicle, and the like.

As described above, the terminal device 200 may be a smartphone, a smart wearable device, a tablet computer, a notebook computer, a desktop computer, or the like that has the foregoing functions. The intelligent vehicle 200 may be a sedan car, a van, a bus, a taxi, a motorcycle, a yacht, or the like that has the foregoing functions. This is not specifically limited in this embodiment of this application. The server 300 may be a computer, a server, or the like that has the foregoing functions. The server 300 may be a server, a server cluster including a plurality of servers, or a cloud computing service center. The server 300 may provide a background service for the terminal device 100 and the intelligent vehicle 200, for example, a TSP telematics service platform. This is not specifically limited in this embodiment of this application.

It may be understood that the foregoing application scenarios are merely several example implementations in embodiments of this application. The application scenarios in embodiments of this application include but are not limited to the foregoing application scenarios. Other scenarios and examples are not listed and described.

Figure 8:
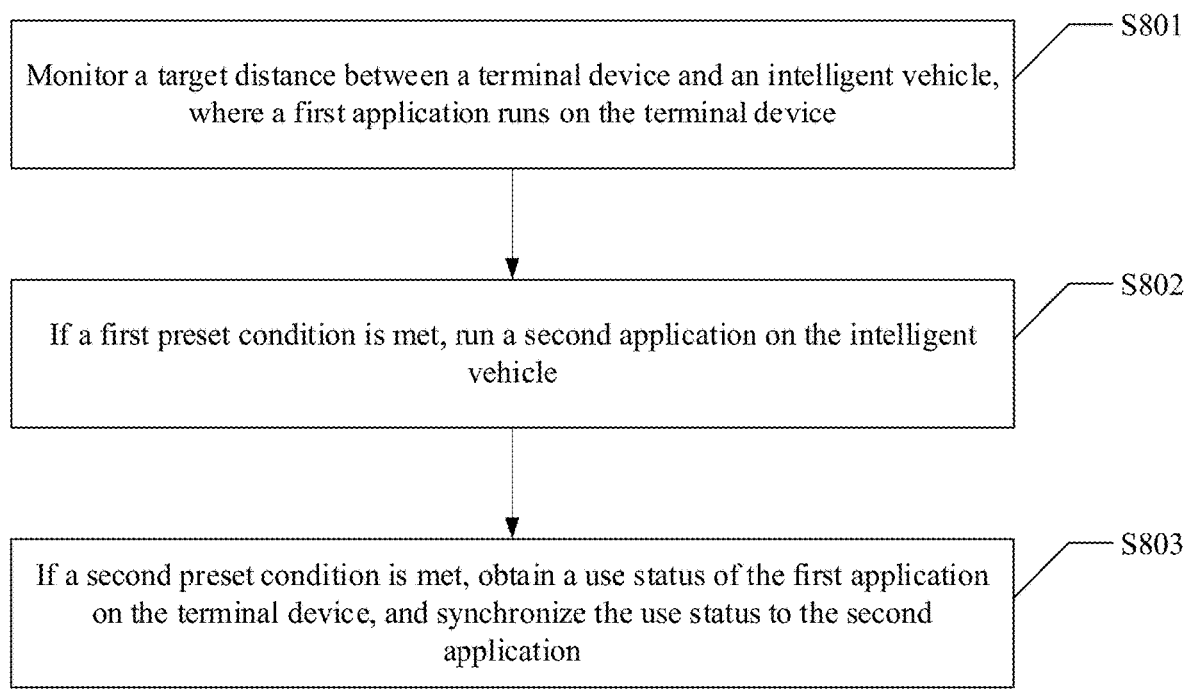
FIG. 8 is a schematic flowchart of an application processing method according to an embodiment of this application.

Refer to FIG. 8. FIG. 8 is a schematic flowchart of an application processing method according to an embodiment of this application. The method may be applied to the system architecture shown in FIG. 1 and the application scenario shown in FIG. 5. An intelligent vehicle 200 thereof may be configured to support and perform step S801 to step S803 in the method procedure shown in FIG. 8. The following provides descriptions from the perspective of the intelligent vehicle side with reference to FIG. 8. The method may include the following step S801 to step S803.

Step S801: Monitor a target distance between a terminal device and the intelligent vehicle, where a first application runs on the terminal device.

Specifically, the intelligent vehicle detects that the terminal device enters a bluetooth communication range of the intelligent vehicle, and establishes a bluetooth connection to the terminal device. Generally, the terminal device is a device that pre-matches the intelligent vehicle. Then, the intelligent vehicle monitors the target distance between the terminal device and the intelligent vehicle based on the bluetooth connection. The first application may run on the terminal device, and in a process of running the first application, the terminal device may synchronize a use status of the first application to a server, and the server stores the use status.

Optionally, the intelligent vehicle may include N antennas, where N is an integer greater than or equal to 1. The N antennas may be disposed at different positions of a body of the intelligent vehicle, for example, respectively disposed near left and right doors and a central control display screen in the intelligent vehicle. The intelligent vehicle may send a request message to the terminal device through at least one of the N antennas, and receive a response message returned by the terminal device. Then, the intelligent vehicle may monitor the target distance between the terminal device and the intelligent vehicle based on signal strength of the response message. Optionally, a frequency of receiving and sending the message may generally be at a level of milliseconds. Therefore, the target distance between the terminal device and the intelligent vehicle may be continuously and frequently measured, thereby ensuring accuracy and precision of distance monitoring. Optionally, the intelligent vehicle may specifically monitor the target distance between the terminal device and the intelligent vehicle through a bluetooth module (which may include, for example, a bluetooth chip and another discrete device), connected to the N antennas, in a T-Box. In some possible implementations, the intelligent vehicle may alternatively monitor the target distance between the terminal device and the intelligent vehicle through a bluetooth module in a vehicle equipment, and the bluetooth module in the vehicle equipment may alternatively be connected to the N antennas. In some possible implementations, the terminal device may alternatively monitor the target distance between the terminal device and the intelligent vehicle, and the like. This is not specifically limited in this embodiment of this application.

Step S802: If a first preset condition is met, run a second application on the intelligent vehicle.

Specifically, if the first preset condition is met, the intelligent vehicle runs the second application on the intelligent vehicle. The second application may be a version of the first application for the intelligent vehicle. Optionally, the first preset condition may include that the target distance, detected by the intelligent vehicle, between the terminal device and the intelligent vehicle is less than a first threshold (for example, 2.8 m or 3 m). Optionally, the first preset condition may further include that the target distance is less than the first threshold and is maintained within the first threshold for a period of time (for example, 5 s, 7 s, or 10 s). Optionally, the first preset condition may further include one or more of the following: a change trend of the target distance is a gradually shortening trend, and a change trend of the target distance is gradually approaching a door of a driving seat of the intelligent vehicle. Optionally, the first preset condition may further include that the user touches any door handle, opens any vehicle door, or the like. This is not specifically limited in this embodiment of this application.

Optionally, as described above, in some possible implementations, the terminal device may alternatively monitor the target distance between the terminal device and the intelligent vehicle by using the terminal device. For example, when the terminal device detects that the target distance is less than the first threshold, the terminal device may notify, through a bluetooth communication channel between the terminal device and the intelligent vehicle, the intelligent vehicle to run the second application on the vehicle. This is not specifically limited in this embodiment of this application.

Step S803: If a second preset condition is met, obtain a use status of the first application on the terminal device, and synchronize the use status of the first application to the second application.

Specifically, if the second preset condition is met, the intelligent vehicle may obtain the current use status of the first application on the terminal device from the server, and synchronize the use status to the second application. In this way, experience of automatically synchronizing and switching the application use status between the terminal device and the intelligent vehicle is achieved. After entering the intelligent vehicle, the user may directly continue, on the second application in the synchronized use status, with the use of the first application, thereby reducing user operations and improving user experience.

Optionally, the second preset condition may include that the target distance, detected by the intelligent vehicle, between the terminal device and the intelligent vehicle is less than a second threshold (for example, 1 m or 2 m). Optionally, the second preset condition may further include that the target distance is less than the second threshold and is maintained within the second threshold for a period of time (for example, 5 s, 7 s, or 10 s). Optionally, the second preset condition further includes one or more of the following: the intelligent vehicle is in an unlocked state, the intelligent vehicle is in a started state, the terminal device is located in the intelligent vehicle, and pressure measured by a pressure sensor is greater than or equal to the preset pressure value. The pressure sensor may be a pressure sensor corresponding to the driving seat or a passenger seat of the intelligent vehicle, or the like. This is not specifically limited in this embodiment of this application.

In some possible implementations, the first preset condition and the second preset condition may be a same condition, that is, the first threshold may be equal to the second threshold. Therefore, when detecting that the target distance between the intelligent vehicle and the terminal device is less than a specific threshold (for example, less than 3 m), the intelligent vehicle may run the second application on the vehicle, and synchronize the use status of the first application on the terminal device to the second application, and so on. This is not specifically limited in this embodiment of this application.

Optionally, as described above, in some possible implementations, the terminal device may alternatively monitor the target distance between the terminal device and the intelligent vehicle by using the terminal device. For example, when the terminal device detects that the target distance is less than the second threshold or detects that the intelligent vehicle is unlocked, the terminal device may further notify, through the bluetooth communication channel between the terminal device and the intelligent vehicle, the intelligent vehicle to synchronize the current use status of the first application on the terminal device to the second application on the vehicle. This is not specifically limited in this embodiment of this application. In this way, the user's intention of entering the vehicle can be flexibly analyzed and estimated, and behavior of the user's intention of entering the vehicle can be detected, so as to determine whether to run the related second application on the vehicle and synchronize the current use status of the first application on the terminal device to the second application on the vehicle. In this way, experience of automatically synchronizing and switching the application use status between the terminal device and the intelligent vehicle is accurately and efficiently achieved. After entering the intelligent vehicle, the user may directly continue, on the second application in the synchronized use status, with the use of the first application, thereby reducing user operations and greatly improving user experience.

Figure 9:
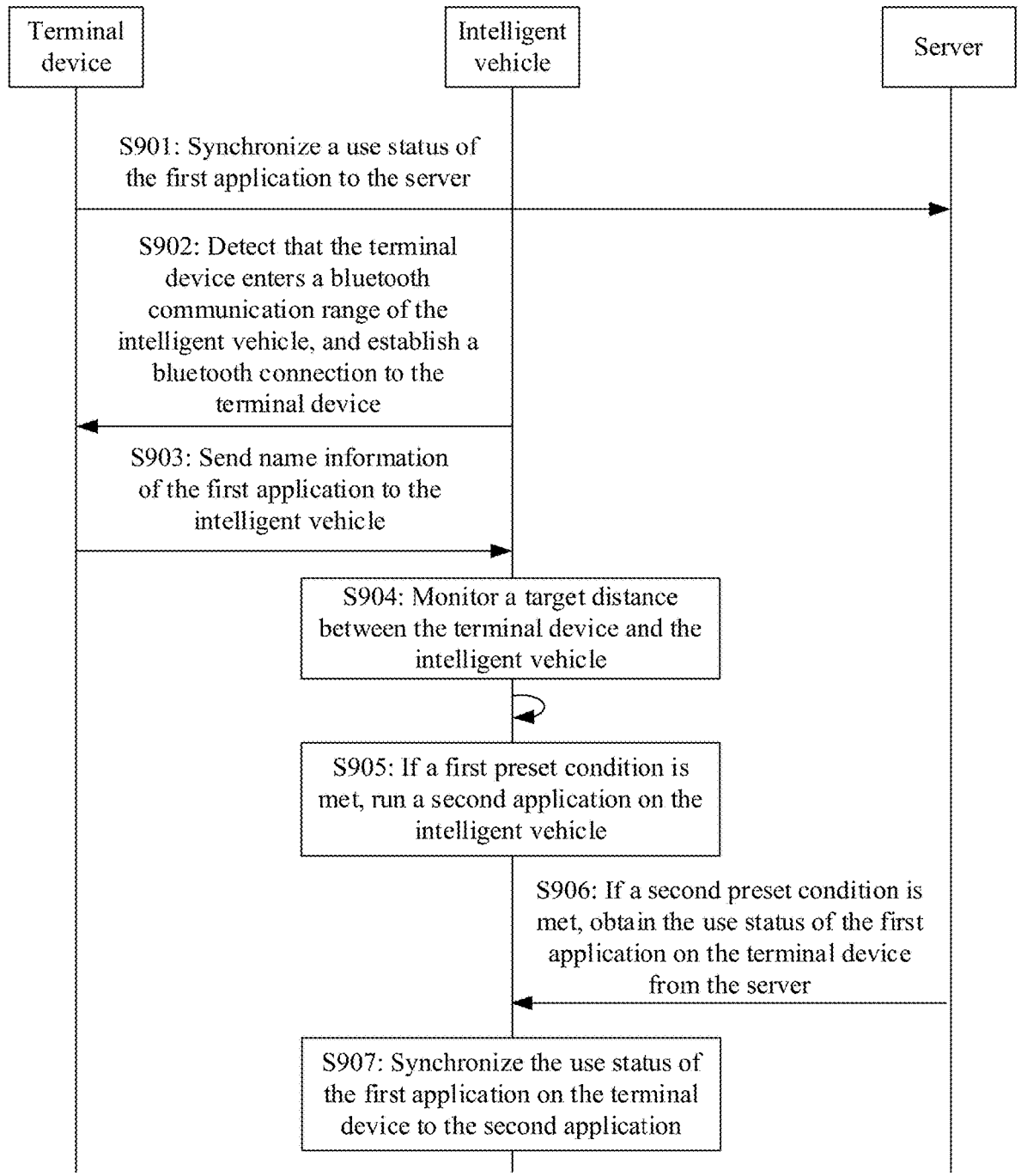
FIG. 9 is a schematic flowchart of another application processing method according to an embodiment of this application.

Refer to FIG. 9. FIG. 9 is a schematic flowchart of another application processing method according to an embodiment of this application. The method may be applied to the system architecture shown in FIG. 1 and the application scenario shown in FIG. 5. A terminal device 100, an intelligent vehicle 200, and a server 300 thereof may be configured to support and perform step S901 to step S907 in the method procedure shown in FIG. 9. The following provides descriptions with reference to FIG. 9 from the perspective of interaction between the terminal device, the intelligent vehicle, and the server. The method may include the following step S901 to step S907.

Step S901: Synchronize a use status of a first application to the server.

Figure 10A:
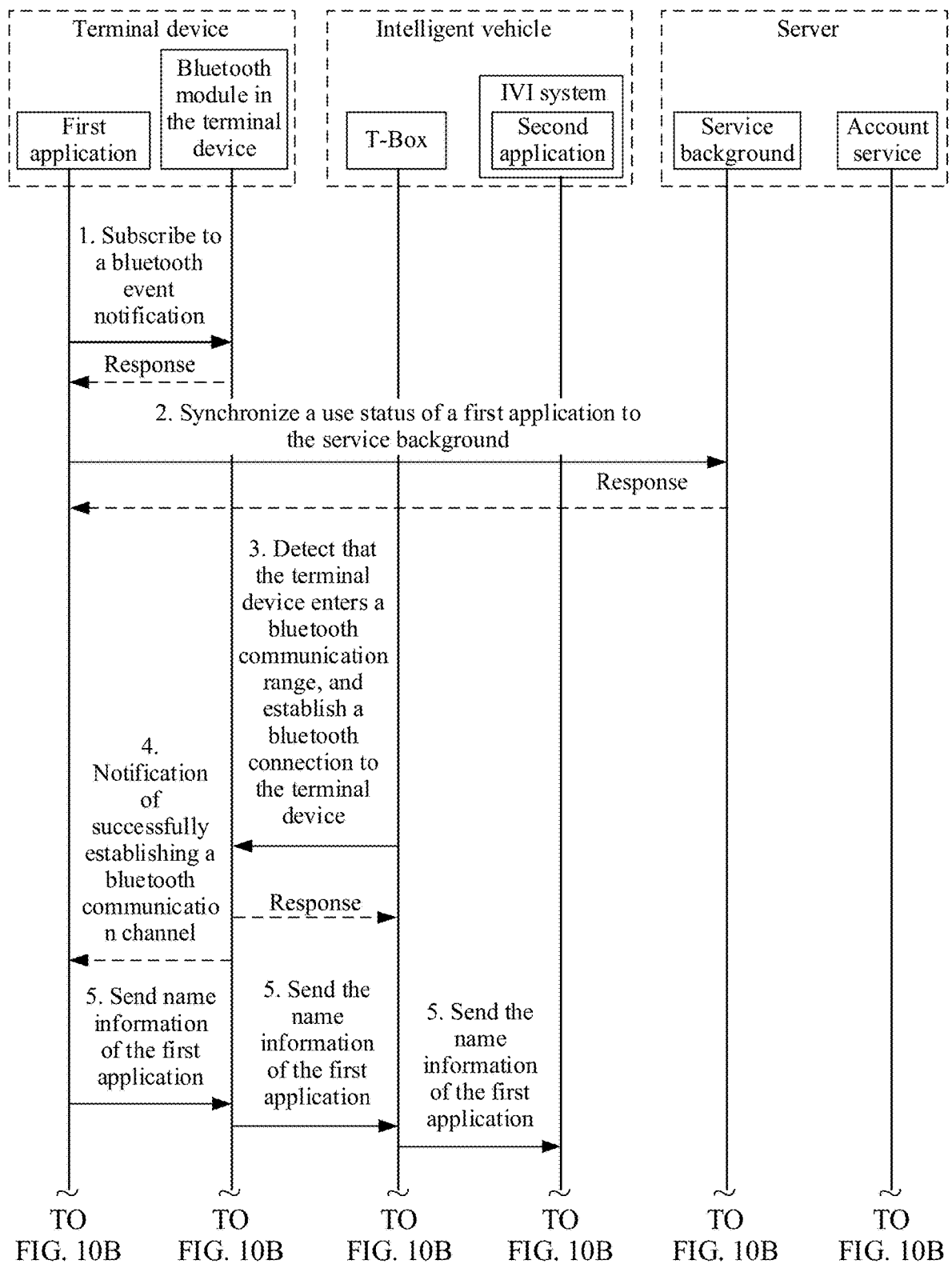
FIG. 10A and FIG. 10B are a schematic flowchart of still another application processing method according to an embodiment of this application.
Figure 10B:
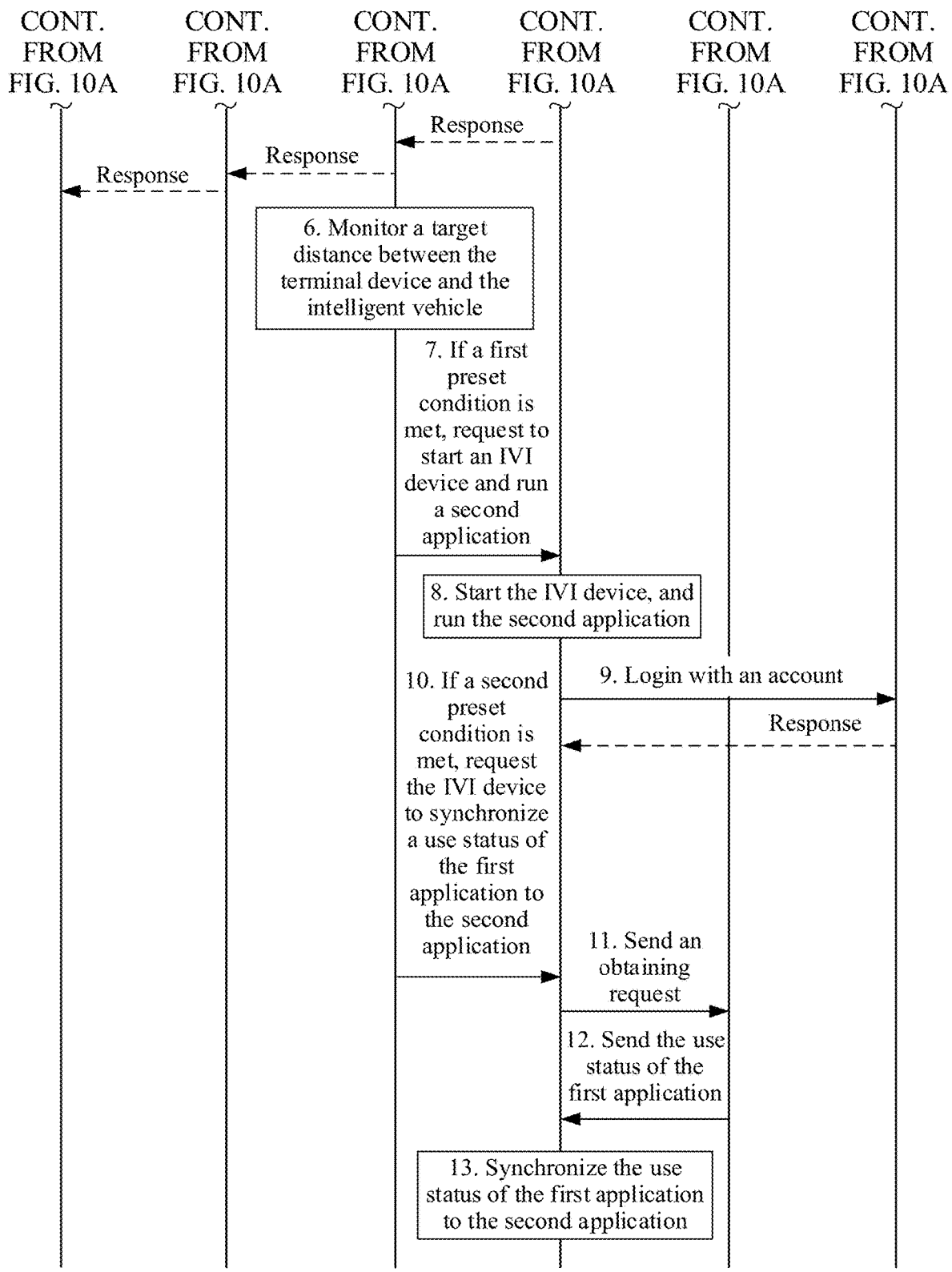

Specifically, in a process of running the first application, the terminal device may synchronize the use status of the first application to the server. Refer to FIG. 10A and FIG. 10B. FIG. 10A and FIG. 10B are a schematic flowchart of still another application processing method according to an embodiment of this application. As shown in step 2 in FIG. 10A and FIG. 10B, the terminal device may specifically synchronize the use status of the first application to a service background in the server, and the service background stores the use status.

Step S902: Detect that the terminal device enters a bluetooth communication range of the intelligent vehicle, and establish a bluetooth connection to the terminal device.

Specifically, for step S902, refer to step S801 in the embodiment corresponding to FIG. 8. Details are not described herein again.

Optionally, after the intelligent vehicle establishes the bluetooth connection to the terminal device, the intelligent vehicle may further initiate authentication without awareness to the terminal device. A subsequent operation can be performed only after the authentication of the terminal device succeeds (for example, the terminal device determines that user and vehicle information stored in the terminal device is the same as user and vehicle information stored in the intelligent vehicle). Otherwise, the two parties may disconnect the bluetooth connection. Optionally, the intelligent vehicle may alternatively initiate biometric authentication to the terminal device, for example, the user needs to enter a fingerprint or perform face authentication or the like. In this way, it can be further avoided that a terminal device of another user interacts with the intelligent vehicle to obtain user information or even open a vehicle door or start the vehicle to harm user interests.

Step S903: Send name information of the first application to the intelligent vehicle.

Specifically, refer to step 1, step 4, and step 5 in FIG. 10A and FIG. 10B. The terminal device may subscribe to a bluetooth event notification in advance. After a bluetooth communication channel between the terminal device and the intelligent vehicle is successfully established, the terminal device may receive a notification indicating that the bluetooth communication channel is successfully established. Then, the terminal device may communicate with a T-Box (the T-Box may include an in-vehicle bluetooth module) in the intelligent vehicle through a bluetooth module in the terminal device based on the bluetooth communication channel, and send the name information of the first application. Optionally, the terminal device may not subscribe to the bluetooth event notification, but continuously monitor, at a specific frequency, whether the bluetooth communication channel between the terminal device and the intelligent vehicle is successfully established. This is not specifically limited in this embodiment of this application. Optionally, the terminal device may further send, to the intelligent vehicle, account information for logging in to the first application by the user. Optionally, if the first application is a music application or a video application, the terminal device may further send, to the intelligent vehicle, a name of a song or a video that is being played, or the like. This is not specifically limited in this embodiment of this application.

Step S904: Monitor a target distance between the terminal device and the intelligent vehicle.

Specifically, for step S902, refer to step S801 in the embodiment corresponding to FIG. 8. Details are not described herein again.

Step S905: If a first preset condition is met, run a second application on the intelligent vehicle.

Specifically, for step S905, refer to step S802 in the embodiment corresponding to FIG. 8. Details are not described herein again.

Optionally, refer to step 7 and step 8 in FIG. 10A and FIG. 10B. After the T-box detects that the first preset condition is met (for example, the target distance between the terminal device and the intelligent vehicle is less than 3 m), the T-box may request to start the vehicle equipment, that is, wake up the vehicle equipment, and run the second application on the vehicle equipment. Optionally, refer to step 9 in FIG. 10A and FIG. 10B. After running the second application, the vehicle equipment may further perform login by using an account service in the server based on the received account information or account information stored when the vehicle equipment previously logs in to the second application, to ensure that an account for logging in to the second application is consistent with an account for logging in to the first application by the user.

Step S906: If a second preset condition is met, obtain the use status of the first application on the terminal device from the server.

Specifically, for step S906, refer to step S803 in the embodiment corresponding to FIG. 8. Details are not described herein again.

Optionally, refer to step 10, step 11, and step 12 in FIG. 10A and FIG. 10B. After the T-box detects that the second preset condition is met (for example, the target distance between the terminal device and the intelligent vehicle is less than 1 m), the T-box may request the vehicle equipment to synchronize the current use status of the first application on the terminal device to the second application. Based on the request, the vehicle equipment sends an obtaining request to the service background in the server. The obtaining request may carry the name information and the account information of the first application. Then, the server sends the current use status of the first application to the vehicle equipment.

Step S907: Synchronize the use status of the first application on the terminal device to the second application.

Specifically, for step S907, refer to step S803 in the embodiment corresponding to FIG. 8. Details are not described herein again.

Optionally, after synchronizing the current use status of the first application on the terminal device to the second application, the intelligent vehicle may further send a target message to the terminal device. The target message may be used to indicate the terminal device to exit the first application, so that the second application on the vehicle completely takes over a service of the first application on the terminal device, thereby reducing power consumption of the terminal device.

Optionally, if a third preset condition is met, the intelligent vehicle may further exit the second application, and further, a use status of the second application may also be synchronized to the first application of the terminal device. The third preset condition may include one or more of the following: the target distance is greater than a third threshold (for example, 2.5 m), the intelligent vehicle is in a locked state, the intelligent vehicle is in a shut-off state, the terminal device is located outside the intelligent vehicle, and pressure measured by a pressure sensor is less than a preset pressure value. For example, when the user leaves the intelligent vehicle but does not manually exit the second application, if the T-Box in the intelligent vehicle detects that the target distance between the terminal device and the intelligent vehicle is greater than 2.5 m, the T-Box may request the vehicle equipment to exit the second application, and to close the vehicle equipment, so as to reduce unnecessary electrical energy consumption and ensure service life of the intelligent vehicle. Optionally, when running the second application, the intelligent vehicle may also synchronize the use status of the second application to the server in real time. Therefore, for example, when it is detected that the target distance between the terminal device and the intelligent vehicle is greater than 2.5 m, the intelligent vehicle may send an indication message to the terminal device, to indicate the terminal device to run the corresponding first application, obtain the use status of the second application from the server, and synchronize the use status of the second application to the first application, and so on. Details are not described herein. In this way, applications can be freely switched in different cases, further improving user experience. Optionally, the third preset condition may further include that the target distance, detected by the intelligent vehicle, between the terminal device and the intelligent vehicle is greater than the third threshold and is maintained within the third threshold for a period of time (for example, 5 s, 7 s, or 10 s). In this way, it may be further ensured that the user really leaves, the second application may be exited, and the vehicle equipment may be closed.

It should be noted that, in some possible implementations, the first preset condition, the second preset condition, and the third preset condition may include a plurality of cases. A developer may perform different settings according to an actual requirement of the user, performance of the intelligent vehicle, and the like. For example, for some intelligent vehicles with relatively poor performance, such as some low-end or mid-end intelligent vehicles, it takes a relatively long time to start a vehicle equipment and run an in-vehicle application. In this case, it may be set that after the terminal device establishes a bluetooth connection to the intelligent vehicle (in this case, the target distance may be approximately 15 m or 20 m), the intelligent vehicle runs a corresponding second application on the vehicle, and then synchronizes the current use status of the first application running on the terminal device to the second application on the vehicle when the terminal device is relatively close to the intelligent vehicle (for example, 2 m or 3 m). In this way, it is ensured that after entering the intelligent vehicle, the user may directly continue, on the second application in the synchronized use status, with the use of the first application. It may be understood that the example descriptions in embodiments of this application do not constitute a specific limitation on the foregoing preset condition, and other possible examples are not described herein. This embodiment of this application is intended to automatically run the related second application on the vehicle and synchronize the current use status of the first application on the terminal device to the second application on the vehicle based on analysis and estimation of the user's intention of entering the vehicle and detection of a plurality of users' behavior of entering the vehicle. In this way, experience of automatically synchronizing and switching the application use status between the terminal device and the intelligent vehicle is accurately and efficiently achieved. After entering the intelligent vehicle, the user may directly continue, on the second application in the synchronized use status, with the use of the first application, thereby reducing user operations and greatly improving user experience.

Figure 11:
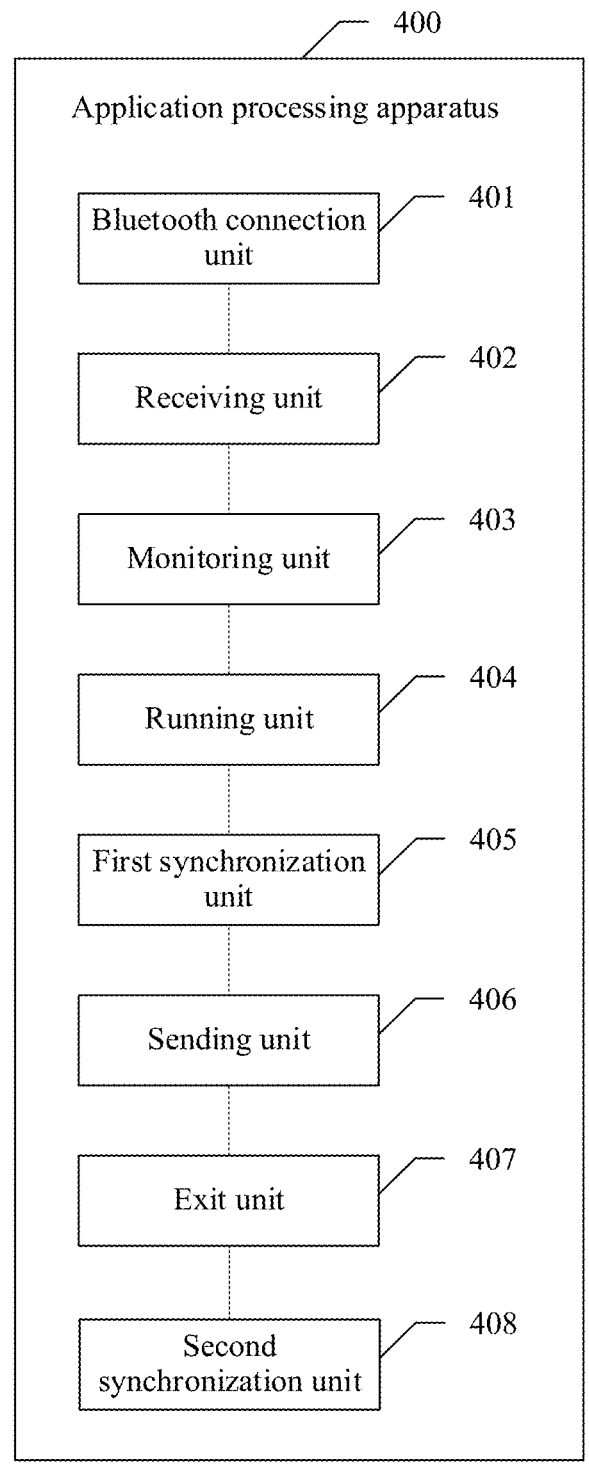
FIG. 11 is a schematic diagram of a structure of an application processing apparatus according to an embodiment of this application.

Refer to FIG. 11. FIG. 11 is a schematic diagram of a structure of an application processing apparatus according to an embodiment of this application. The application processing apparatus may be applied to the foregoing intelligent vehicle. The application processing apparatus may include an apparatus 400. The apparatus 400 may include a monitoring unit 403, a running unit 404, and a first synchronization unit 405. Detailed descriptions of the units are as follows:

The monitoring unit 403 is configured to monitor a target distance between a terminal device and the intelligent vehicle, where a first application runs on the terminal device.

The running unit 404 is configured to: if a first preset condition is met, run a second application on the intelligent vehicle, where the first preset condition includes that the target distance is less than a first threshold, and the second application is a version of the first application for the intelligent vehicle.

The first synchronization unit 405 is configured to: if a second preset condition is met, obtain a use status of the first application on the terminal device, and synchronize the use status to the second application, where the second preset condition includes that the target distance is less than a second threshold, and the second threshold is less than the first threshold.

In a possible implementation, the apparatus 400 further includes:

a bluetooth connection unit 401, configured to establish a bluetooth connection to the terminal device, where the terminal device is a device that pre-matches the intelligent vehicle.

In a possible implementation, the intelligent vehicle includes N antennas, N is an integer greater than or equal to 1, and the monitoring unit 403 is specifically configured to:

send a request message to the terminal device through at least one of the N antennas based on the bluetooth connection to the terminal device, and receive a response message returned by the terminal device;

monitor the target distance between the terminal device and the intelligent vehicle based on signal strength of the response message.

In a possible implementation, the apparatus 400 further includes:

a receiving unit 402, configured to receive name information of the first application sent by the terminal device.

In a possible implementation, the running unit 404 is specifically configured to:

determine the second application on the intelligent vehicle based on the name information, and run the second application.

In a possible implementation, the use status of the first application is a status that is of the first application running on the terminal device and that is synchronized to a server. The first synchronization unit 405 is specifically configured to:

send an obtaining request to the server, where the obtaining request carries the name information;

obtain the use status of the first application on the terminal device from the server based on the name information.

In a possible implementation, the first preset condition further includes one or more of the following: a change trend of the target distance is a gradually shortening trend, and a change trend of the target distance is gradually approaching a door of a driving seat of the intelligent vehicle.

In a possible implementation, the second preset condition further includes one or more of the following: the intelligent vehicle is in an unlocked state, the intelligent vehicle is in a started state, the terminal device is located in the intelligent vehicle, and pressure measured by a pressure sensor is greater than or equal to a preset pressure value. The pressure sensor is a pressure sensor corresponding to the driving seat or a passenger seat of the intelligent vehicle.

In a possible implementation, the apparatus 400 further includes:

a sending unit 406, configured to send a target message to the terminal device, where the target message is used to indicate the terminal device to exit the first application.

In a possible implementation, if a third preset condition is met, the apparatus 400 further includes:

an exit unit 407, configured to exit the second application, where the third preset condition includes one or more of the following: the target distance is greater than a third threshold, the intelligent vehicle is in a locked state, the intelligent vehicle is in a shut-off state, the terminal device is located outside the intelligent vehicle, and pressure measured by the pressure sensor is less than a preset pressure value; and the pressure sensor is a pressure sensor corresponding to the driving seat or a passenger seat of the intelligent vehicle; and a second synchronization unit 408, configured to synchronize a use status of the second application to the first application of the terminal device.

It should be noted that, for functions of functional units in the application processing apparatus described in this embodiment of this application, refer to related descriptions of step S801 to step S803 in the method embodiment in FIG. 8, and refer to related descriptions of step S901 to step S907 in the method embodiment in FIG. 9. Details are not described herein again.

Each unit in FIG. 11 may be implemented by software, hardware, or a combination thereof. A unit implemented by hardware may include a logic circuit, an algorithm circuit, an analog circuit, or the like. A unit implemented by software may include program instructions, and is considered as a software product stored in a memory, and may be run by a processor to implement a related function. For details, refer to the foregoing descriptions.

Figure 12:
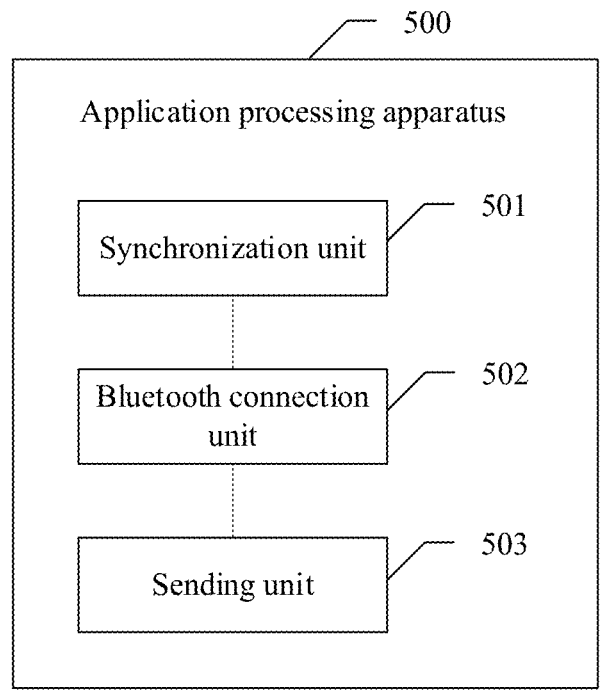
FIG. 12 is a schematic diagram of a structure of another application processing apparatus according to an embodiment of this application.

Refer to FIG. 12. FIG. 12 is a schematic diagram of a structure of another application processing apparatus according to an embodiment of this application. The application processing apparatus may be applied to a client. The application processing apparatus may include an apparatus 500, and the apparatus 500 may include a sending unit 503. Detailed descriptions of the units are as follows:

The sending unit 503 is configured to: send name information of the first application to an intelligent vehicle, where the name information is used by the intelligent vehicle to determine a second application on the intelligent vehicle based on the name information when a first preset condition is met, and to run the second application; and is used by the intelligent vehicle to obtain a use status of the first application on the terminal device based on the name information when a second preset condition is met, and synchronize the use status to the second application. The second application is a version of the first application for the intelligent vehicle. The first preset condition includes that a target distance between the terminal device and the intelligent vehicle is less than a first threshold. The second preset condition includes that the target distance is less than a second threshold. The second threshold is less than the first threshold.

In a possible implementation, the apparatus 500 further includes:

a synchronization unit 501, configured to synchronize the use status of the first application to a server, where the server is used by the intelligent vehicle to obtain the use status of the first application on the terminal device from the server based on the name information.

In a possible implementation, the apparatus 500 further includes:

a bluetooth connection unit 502, configured to establish a bluetooth connection to the intelligent vehicle, where the terminal device is a device that pre-matches the intelligent vehicle.

It should be noted that, for functions of functional units in the application processing apparatus described in this embodiment of this application, refer to related descriptions of step S801 to step S803 in the method embodiment in FIG. 8, or refer to related descriptions of step S901 to step S907 in the method embodiment in FIG. 9. Details are not described herein again.

Each unit in FIG. 12 may be implemented by software, hardware, or a combination thereof. A unit implemented by hardware may include a logic circuit, an algorithm circuit, an analog circuit, or the like. A unit implemented by software may include program instructions, and is considered as a software product stored in a memory, and may be run by a processor to implement a related function. For details, refer to the foregoing descriptions.

Figure 13:
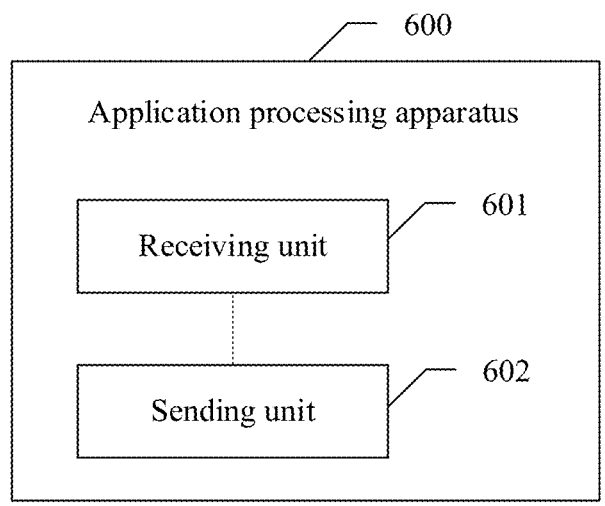
FIG. 13 is a schematic diagram of a structure of still another application processing apparatus according to an embodiment of this application.

Refer to FIG. 13. FIG. 13 is a schematic diagram of a structure of still another application processing apparatus according to an embodiment of this application. The application processing apparatus may be applied to a server. The application processing apparatus may include an apparatus

600. The apparatus 600 may include a receiving unit 601 and a sending unit 602. Detailed descriptions of the units are as follows:

The receiving unit 601 is configured to receive a use status that is of a first application running on a terminal device and that is synchronized to the first application of the server.

The sending unit 602 is configured to send the use status of the first application on the terminal device to the intelligent vehicle based on an obtaining request of the intelligent vehicle, where the use status is used by the intelligent vehicle to synchronize the use status to a second application. The second preset condition includes that a target distance between the terminal device and the intelligent vehicle is less than a second threshold. The second application is a version of the first application for the intelligent vehicle.

It should be noted that, for functions of functional units in the application processing apparatus described in this embodiment of this application, refer to related descriptions of step S801 to step S803 in the method embodiment in FIG. 8, or refer to related descriptions of step S901 to step S907 in the method embodiment in FIG. 9. Details are not described herein again.

Each unit in FIG. 13 may be implemented by software, hardware, or a combination thereof. A unit implemented by hardware may include a logic circuit, an algorithm circuit, an analog circuit, or the like. A unit implemented by software may include program instructions, and is considered as a software product stored in a memory, and may be run by a processor to implement a related function. For details, refer to the foregoing descriptions.

Figure 14:
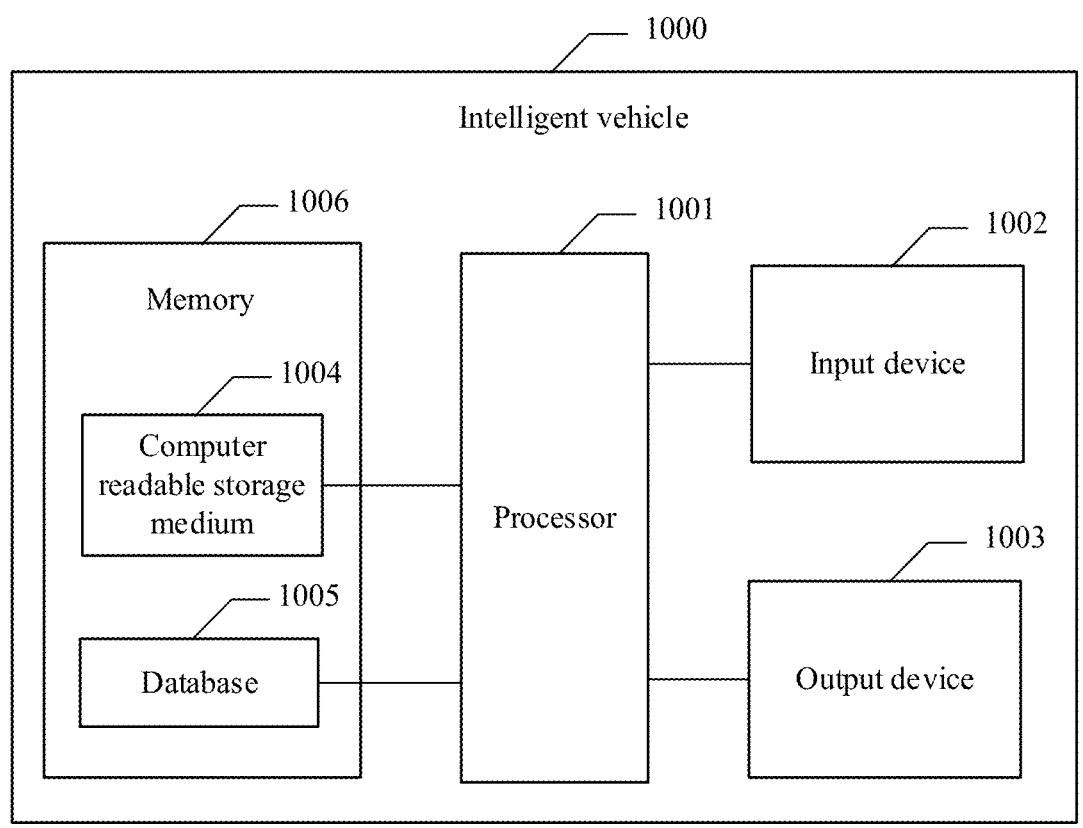
FIG. 14 is a schematic diagram of a structure of an intelligent vehicle according to an embodiment of this application.

Based on the descriptions of the foregoing method embodiments and apparatus embodiments, an embodiment of this application further provides a computing device. Refer to FIG. 14. FIG. 14 is a schematic diagram of a structure of an intelligent vehicle according to an embodiment of this application. The intelligent vehicle 1000 includes at least a processor 1001, an input device 1002, an output device 1003, a computer readable storage medium 1004, a database 1005, and a memory 1006. The intelligent vehicle 1000 may further include another general-purpose component. Details are not described herein. The processor 1001, the input device 1002, the output device 1003, and the computer readable storage medium 1004 in the intelligent vehicle 1000 may be connected through a bus or in another manner.

The processor 1001 may be a general-purpose central processing unit (CPU), a microprocessor, an application-specific integrated circuit (ASIC), or one or more integrated circuits configured to control program execution of the foregoing solution.

The memory 1006 in the intelligent vehicle 1000 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1006 is not limited thereto. The memory 1006 may independently exist and is connected to the processor 1001 through a bus. Alternatively, the memory 1006 may be integrated with the processor 1001.

The computer readable storage medium 1004 may be stored in the memory 1006 of the intelligent vehicle 1000. The computer readable storage medium 1004 is configured to store a computer program. The computer program includes program instructions. The processor 1001 is configured to execute the program instructions stored in the computer readable storage medium 1004. The processor 1001 (or referred to as a CPU (Central Processing Unit)) is a core of computing and control of the intelligent vehicle 1000, and is suitable for implementing one or more instructions, and specifically suitable for loading and executing one or more instructions to implement a corresponding method procedure or a corresponding function. In one embodiment, the processor 1001 in this embodiment of this application may be configured to perform a series of processing for application processing, including: monitoring a target distance between a terminal device and the intelligent vehicle, where a first application runs on the terminal device; if a first preset condition is met, running a second application on the intelligent vehicle, where the first preset condition includes that the target distance is less than a first threshold, and the second application is a version of the first application for the intelligent vehicle; if a second preset condition is met, obtaining a use status of the first application on the terminal device, and synchronizing the use status to the second application, where the second preset condition includes that the target distance is less than a second threshold, and the second threshold is less than the first threshold; and so on.

An embodiment of this application further provides a computer readable storage medium (Memory). The computer readable storage medium is a storage device in an intelligent vehicle 1000, and is configured to store a program and data. It may be understood that the computer readable storage medium herein may include a built-in storage medium in the intelligent vehicle 1000, and certainly, may also include an extended storage medium supported by the intelligent vehicle 1000. The computer readable storage medium provides storage space, and the storage space stores an operating system of the intelligent vehicle 1000. In addition, the storage space further stores one or more instructions that are suitable for being loaded and executed by the processor 1001. These instructions may be one or more computer programs (including program code). It should be noted that the computer readable storage medium herein may be a high-speed RAM memory, or may be a non-volatile memory, for example, at least one magnetic disk storage, or optionally, may be at least one computer readable storage medium located away from the foregoing processor.

An embodiment of this application further provides a computer program. The computer program includes instructions. When the computer program is executed by a computer, the computer is enabled to perform some or all steps of any application processing method.

It should be noted that, for functions of the functional units in the intelligent vehicle 1000 described in this embodiment of this application, refer to related descriptions of step S801 to step S803 in the method embodiment in FIG. 8, or refer to related descriptions of step S901 to step S907 in the method embodiment in FIG. 9, or refer to related descriptions of step 1 to step S13 in the method embodiment in FIG. 10A and FIG. 10B. Details are not described herein again.

In the foregoing embodiments, the description of each embodiment has respective focuses. For a part that is not described in detail in a specific embodiment, refer to related descriptions in another embodiment.

Figure 15:
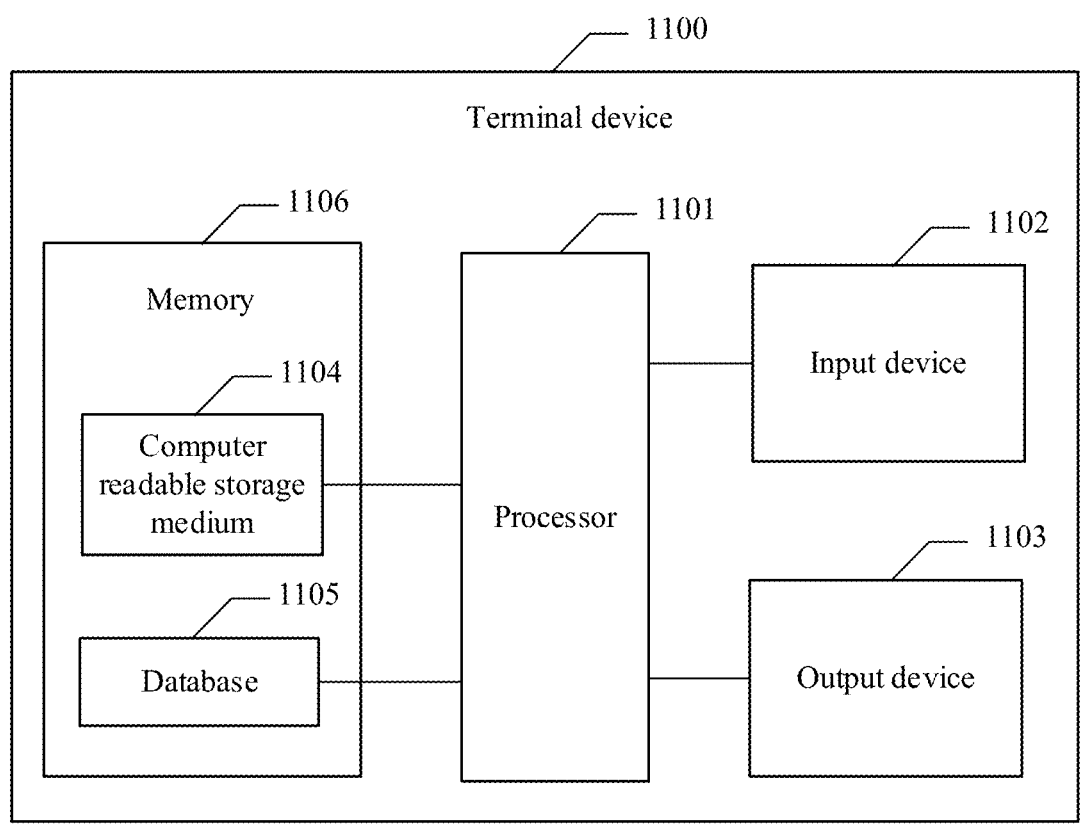
FIG. 15 is a schematic diagram of a structure of a terminal device according to an embodiment of this application.

Based on the descriptions of the foregoing method embodiments and apparatus embodiments, an embodiment of this application further provides a terminal device. Refer to FIG. 15. FIG. 15 is a schematic diagram of a structure of a terminal device according to an embodiment of this application. The terminal device 1100 includes at least a processor 1101, an input device 1102, an output device 1103, a computer readable storage medium 1104, a database 1105, and a memory 1106. The terminal device 1100 may further include another general-purpose component. Details are not described herein.

The processor 1101 is configured to execute program instructions stored in the computer readable storage medium 1104. The processor 1101 (or referred to as a CPU (Central Processing Unit)) is a core of computing and control of the terminal device 1100, and is suitable for implementing one or more instructions, and specifically suitable for loading and executing the one or more instructions to implement a corresponding method procedure or a corresponding function. In one embodiment, the processor 1101 in this embodiment of this application may be configured to perform a series of processing for application processing, including: sending name information of the first application to an intelligent vehicle, where the name information is used by the intelligent vehicle to determine a second application on the intelligent vehicle when a first preset condition is met, and run the second application; and is used by the intelligent vehicle to obtain a current use status of the first application on the terminal device based on the name information when a second preset condition is met, and to synchronize the use status to the second application. The second application is a version of the first application for the intelligent vehicle, the first preset condition includes that a target distance between the terminal device and the intelligent vehicle is less than a first threshold, the second preset condition includes that the target distance is less than a second threshold, and the second threshold is less than the first threshold, and so on.

An embodiment of this application further provides a computer readable storage medium (Memory). The computer readable storage medium is a storage device in an intelligent vehicle 1100, and is configured to store a program and data. It may be understood that the computer readable storage medium herein may include a built-in storage medium in the intelligent vehicle 1100, and certainly, may also include an extended storage medium supported by the intelligent vehicle 1100. The computer readable storage medium provides storage space, and the storage space stores an operating system of the intelligent vehicle 1100. In addition, the storage space further stores one or more instructions that are suitable for being loaded and executed by a processor 1101. These instructions may be one or more computer programs (including program code). It should be noted that the computer readable storage medium herein may be a high-speed RAM memory, or may be a non-volatile memory, for example, at least one magnetic disk storage; or optionally, may be at least one computer readable storage medium located away from the foregoing processor.

An embodiment of this application further provides a computer program. The computer program includes instructions. When the computer program is executed by a computer, the computer is enabled to perform some or all steps of any application processing method.

It should be noted that, for functions of the functional units in the intelligent vehicle 1100 described in this embodiment of this application, refer to related descriptions of step S801 to step S803 in the method embodiment in FIG. 8, or refer to related descriptions of step S901 to step S907 in the method embodiment in FIG. 9, or refer to related descriptions of step Si to step S13 in the method embodiment in FIG. 10A and FIG. 10B. Details are not described herein again.

In the foregoing embodiments, the description of each embodiment has respective focuses. For a part that is not described in detail in a specific embodiment, refer to related descriptions in another embodiment.

Figure 16:
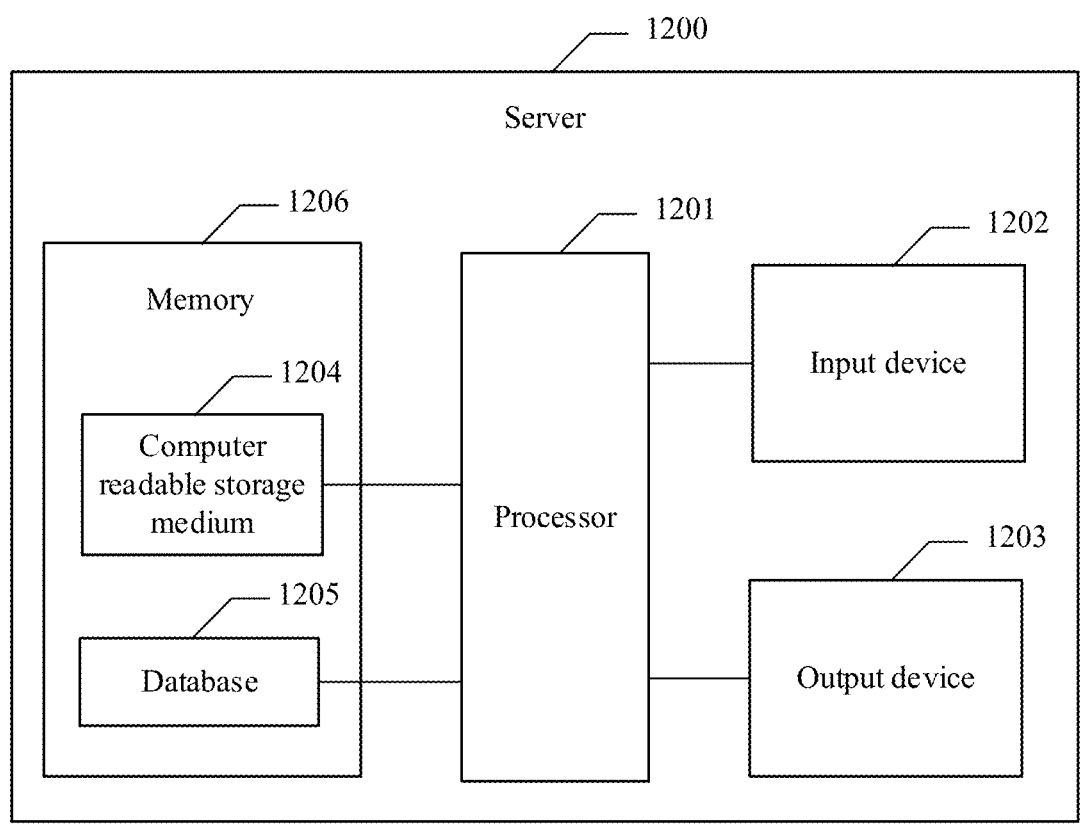
FIG. 16 is a schematic diagram of a structure of a server according to an embodiment of this application.

Based on the descriptions of the foregoing method embodiments and apparatus embodiments, an embodiment of this application further provides a server. Refer to FIG. 16. FIG. 16 is a schematic diagram of a structure of a server according to an embodiment of this application. The server 1200 includes at least a processor 1201, an input device 1202, an output device 1203, a computer readable storage medium 1204, a database 1205, and a memory 1206. The server 1200 may further include another general-purpose component. Details are not described herein.

The processor 1201 is configured to execute program instructions stored in the computer readable storage medium 1204. The processor 1201 (or referred to as a CPU (Central Processing Unit)) is a core of computing and control of the server 1200, and is suitable for implementing one or more instructions, and specifically suitable for loading and executing one or more instructions to implement a corresponding method procedure or a corresponding function. In one embodiment, the processor 1201 in this embodiment of this application may be configured to perform a series of processing for application processing, including: receiving a use status that is of a first application running on a terminal device and that is synchronized to the first application of the server; and sending the use status of the first application on the terminal device to the intelligent vehicle based on an obtaining request of the intelligent vehicle. The use status is used by the intelligent vehicle to synchronize the use status to a second application based on the use status, the second preset condition includes that a target distance between the terminal device and the intelligent vehicle is less than a second threshold, and the second application is a version of the first application for the intelligent vehicle, and so on.

An embodiment of this application further provides a computer readable storage medium (Memory). The computer readable storage medium is a storage device in an intelligent vehicle 1200, and is configured to store a program and data. It may be understood that the computer readable storage medium herein may include a built-in storage medium in the intelligent vehicle 1200, and certainly, may also include an extended storage medium supported by the intelligent vehicle 1200. The computer readable storage medium provides storage space, and the storage space stores an operating system of the intelligent vehicle 1200. In addition, the storage space further stores one or more instructions that are suitable for being loaded and executed by the processor 1201. These instructions may be one or more computer programs (including program code). It should be noted that the computer readable storage medium herein may be a high-speed RAM memory, or may be a non-volatile memory, for example, at least one magnetic disk storage, or optionally, may be at least one computer readable storage medium located away from the foregoing processor.

An embodiment of this application further provides a computer program. The computer program includes instructions. When the computer program is executed by a computer, the computer is enabled to perform some or all steps of any application processing method.

It should be noted that, for functions of the functional units in the intelligent vehicle 1200 described in this embodiment of this application, refer to related descriptions of step S801 to step S803 in the method embodiment in FIG. 8, or refer to related descriptions of step S901 to step S907 in the method embodiment in FIG. 9, or refer to related descriptions of step 1 to step S13 in the method embodiment in FIG. 10A and FIG. 10B. Details are not described herein again.

In the foregoing embodiments, the description of each embodiment has respective focuses. For a part that is not described in detail in a specific embodiment, refer to related descriptions in another embodiment.

It should be noted that, for brief description, the foregoing method embodiments are represented as a series of actions. However, persons skilled in the art should appreciate that this application is not limited to the described order of the actions, because according to this application, some steps may be performed in other orders or simultaneously. In addition, it should be further appreciated by persons skilled in the art that embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The foregoing units described as separate parts may or may not be physically separate, and parts displayed as units may or may not be physical units, may be located in a position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units are integrated into one unit. The foregoing integrated unit may be implemented in a form of hardware, or may be implemented in a form of a software function unit.

When the foregoing integrated unit is implemented in the form of a software functional unit and sold or used as an independent product, the integrated unit may be stored in one computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device, or may be specifically a processor in a computer device) to perform all or some of the steps of the methods described in embodiments of this application. The foregoing storage medium may include: any medium that can store program code, such as a USB flash drive, a removable hard disk, a magnetic disk, an optical disc, a read-only memory (ROM), or a random access memory In the foregoing descriptions, the foregoing embodiments are merely intended to describe the technical solutions of this application, but not to limit this application. Although this application is described in detail with reference to the foregoing embodiments, persons of ordinary skill in the art should understand that they may still modify the technical solutions described in the foregoing embodiments or make equivalent replacements to some technical features thereof, without departing from the scope of the technical solutions of embodiments of this application.

What is claimed is:

1. An application processing method comprising:
monitoring a distance between a terminal device and an intelligent vehicle;
running a second application on the intelligent vehicle in response to a first preset condition being met, wherein the first preset condition comprises that the distance is less than a first threshold;
obtaining a first use status of a first application running on the terminal device in response to a second preset condition being met, wherein the second preset condition comprises that the distance is less than a second threshold, and the second application is a version of the first application for the intelligent vehicle; and
synchronizing the first use status to the second application on the intelligent vehicle, wherein the first use status is a status of the first application and is synchronized to a server, and wherein obtaining the first use status comprises:
sending an obtaining request to the server, wherein the obtaining request carrying name information of the first application; and
obtaining the first use status from the server based on the name information.

2. The method according to claim 1, wherein the second threshold is less than the first threshold.

3. The method according to claim 2, wherein the first preset condition further comprises one or more of the following: the distance reduces, and the terminal device is gradually approaching a door of a driving seat of the intelligent vehicle.

4. The method according to claim 1, wherein the terminal device is a device that pre-matches the intelligent vehicle.

5. The method according to claim 1, wherein the obtaining a first use status of the first application running on the terminal device comprises:
obtaining the first use status from the terminal device or a server.

6. The method according to claim 1, wherein the second preset condition further comprises one or more of the following:
the intelligent vehicle is in an unlocked state,
the intelligent vehicle is in a started state,
the terminal device is located in the intelligent vehicle, or
a pressure measured by a pressure sensor is greater than or equal to a preset pressure value wherein the pressure sensor corresponds to a driving seat or a passenger seat of the intelligent vehicle.

7. The method according to claim 1, wherein the method further comprises:
sending a target message to the terminal device indicating the terminal device to exit the first application.

8. The method according to claim 1, wherein the method further comprises:

exiting the second application in response to a third preset condition being met, wherein the third preset condition comprises one or more of the following: the distance is greater than a third threshold, the intelligent vehicle is in a locked state, the intelligent vehicle is in a shut-off state, the terminal device is located outside the intelligent vehicle, or a pressure measured by a pressure sensor is less than a preset pressure value wherein the pressure sensor corresponds to a driving seat or a passenger seat of the intelligent vehicle.

9. The method according to claim 8, wherein the method further comprises:
indicating the terminal device to synchronize a second use status of the second application to the first application.

10. The method according to claim 1, wherein
the first application is an audio application of a mobile phone version and the second application is an audio application of a vehicle version, or the first application is a video application of a mobile phone version, and the second application is a video application of a vehicle version; and wherein
the first use status includes at least one of play progress, playlist, play mode, sound effect or volume.

11. An application processing apparatus, comprising at least one processor and at least one memory, wherein the at least one memory stores program instructions, and the at least one processor is coupled to the at least one memory to execute the instructions to:
monitor a distance between a terminal device and an intelligent vehicle;
running a second application on the intelligent vehicle in response to a first preset condition being met, wherein the first preset condition comprises that the distance is less than a first threshold;
obtain a first use status of a first application running on the terminal device in response to a second preset condition being met, wherein the second preset condition comprises that the distance is less than a second threshold, and the second application is a version of the first application for the intelligent vehicle; and
synchronize the first use status to the second application on the intelligent vehicle, wherein the first use status is a status of the first application and is synchronized to a server, and wherein obtaining the first use status comprises:
sending an obtaining request to the server, wherein the obtaining request carrying name information of the first application; and
obtaining the first use status from the server based on the name information.

12. The apparatus according to claim 11, wherein the second threshold is less than the first threshold.

13. The apparatus according to claim 12, wherein the first preset condition further comprises one or more of the following: the distance reduces, and the terminal device is gradually approaching a door of a driving seat of the intelligent vehicle.

14. The apparatus according to claim 11, wherein the terminal device is a device that pre-matches the intelligent vehicle.

15. The apparatus according to claim 11, wherein the at least one processor is coupled to the at least one memory to execute the instructions to:
obtain the first use status from the terminal device or a server.

16. The apparatus according to claim 11, wherein the second preset condition further comprises one or more of the following:
the intelligent vehicle is in an unlocked state,
the intelligent vehicle is in a started state,
the terminal device is located in the intelligent vehicle, or
a pressure measured by a pressure sensor is greater than or equal to a preset pressure value wherein the pressure sensor corresponds to a driving seat or a passenger seat of the intelligent vehicle.

17. The apparatus according to claim 11, wherein the at least one processor is coupled to the at least one memory to execute the instructions to:
send a target message to the terminal device indicating the terminal device to exit the first application.

18. The apparatus according to claim 11, wherein the at least one processor is coupled to the at least one memory to execute the instructions to:
exit the second application in response to a third preset condition being met, wherein the third preset condition comprises one or more of the following: the distance is greater than a third threshold, the intelligent vehicle is in a locked state, the intelligent vehicle is in a shut-off state, the terminal device is located outside the intelligent vehicle, or a pressure measured by a pressure sensor is less than a preset pressure value wherein the pressure sensor corresponds to a driving seat or a passenger seat of the intelligent vehicle.

19. The apparatus according to claim 18, wherein the at least one processor is coupled to the at least one memory to execute the instructions to:
indicate the terminal device to synchronize a second use status of the second application to the first application.

20. The apparatus according to claim 11, wherein
the first application is an audio application of a mobile phone version and the second application is an audio application of a vehicle version, or the first application is a video application of a mobile phone version, and the second application is a video application of a vehicle version; and wherein
the first use status includes at least one of play progress, playlist, play mode, sound effect or volume.

* * * * *